US007010494B2

(12) United States Patent
Etzioni et al.

(10) Patent No.: US 7,010,494 B2
(45) Date of Patent: Mar. 7, 2006

(54) PERFORMING PREDICTIVE PRICING BASED ON HISTORICAL DATA

(75) Inventors: Oren Etzioni, Seattle, WA (US); Alexander Yates, Seattle, WA (US); Craig A. Knoblock, El Segundo, CA (US); Rattapoom Tuchinda, Los Angeles, CA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 10/811,077

(22) Filed: Mar. 26, 2004

(65) Prior Publication Data

US 2005/0004819 A1 Jan. 6, 2005

Related U.S. Application Data

(60) Provisional application No. 60/458,321, filed on Mar. 27, 2003.

(51) Int. Cl.
*G06F 17/60* (2006.01)

(52) U.S. Cl. .......................... 705/1; 705/10; 705/400; 705/412

(58) Field of Classification Search .................... 705/5, 705/26–27, 37, 400, 10, 412
See application file for complete search history.

(56) References Cited

U.S. PATENT DOCUMENTS

| | | | |
|---|---|---|---|
| 4,837,744 A | 6/1989 | Marquot | |
| 5,021,693 A | 6/1991 | Shima | |
| 5,255,184 A | 10/1993 | Hornick | |
| 5,270,921 A | 12/1993 | Hornick | |
| 5,289,401 A | 2/1994 | Shima | |
| 5,704,017 A | 12/1997 | Heckerman | |
| 5,794,207 A | 8/1998 | Walker et al. | |
| 5,797,127 A | 8/1998 | Walker et al. | |
| 5,875,126 A | 2/1999 | Minch | |
| 5,897,620 A | 4/1999 | Walker et al. | |
| 5,918,209 A | 6/1999 | Campbell | |
| 5,933,039 A | 8/1999 | Hui | |
| 6,041,308 A | 3/2000 | Walker et al. | |

(Continued)

FOREIGN PATENT DOCUMENTS

EP 1148433 A1 * 10/2001

(Continued)

OTHER PUBLICATIONS

Rivalwatch.com.*

(Continued)

*Primary Examiner*—John W. Hayes
*Assistant Examiner*—Freda Nelson
(74) *Attorney, Agent, or Firm*—Perkins Coie LLP

(57) ABSTRACT

Techniques are described for using predictive pricing information for items to assist in evaluating buying and/or selling decisions in various ways, such as on behalf of end-user item acquirers and/or intermediate item providers. The predictive pricing for an item may be based on an analysis of historical pricing information for that item and/or related items, and can be used to make predictions about future pricing information for the item. Such predictions may then be provided to users in various ways to enable comparison of current prices to predicted future prices. In some situations, predictive pricing information is used to assist customers when purchasing airline tickets and/or to assist travel agents when selling airline tickets. This abstract is provided to comply with rules requiring an abstract, and it is submitted with the intention that it will not be used to interpret or limit the scope or meaning of the claims.

32 Claims, 21 Drawing Sheets

U.S. PATENT DOCUMENTS

| | | | |
|---|---|---|---|
| 6,085,169 | A | 7/2000 | Walker |
| 6,092,017 | A | 7/2000 | Ishida |
| 6,108,639 | A | 8/2000 | Walker et al. |
| 6,112,185 | A * | 8/2000 | Walker et al. ............ 705/5 |
| 6,134,534 | A | 10/2000 | Walker |
| 6,240,396 | B1 | 5/2001 | Walker et al. |
| 6,263,323 | B1 | 7/2001 | Baggett |
| 6,275,808 | B1 | 8/2001 | DeMarcken |
| 6,295,521 | B1 | 9/2001 | DeMarcken |
| 6,307,572 | B1 | 10/2001 | DeMarcken |
| 6,332,129 | B1 | 12/2001 | Walker et al. |
| 6,345,090 | B1 | 2/2002 | Walker et al. |
| 6,356,878 | B1 | 3/2002 | Walker et al. |
| 6,377,932 | B1 | 4/2002 | DeMarcken |
| 6,381,578 | B1 | 4/2002 | DeMarcken |
| 6,418,413 | B1 | 7/2002 | DeMarcken |
| 6,418,415 | B1 * | 7/2002 | Walker et al. ............ 705/26 |
| 6,484,153 | B1 | 11/2002 | Walker et al. |
| 6,510,418 | B1 | 1/2003 | Case et al. |
| 6,553,346 | B1 | 4/2003 | Walker et al. |
| 6,567,824 | B1 | 5/2003 | Fox |
| 6,609,098 | B1 | 8/2003 | DeMarcken |
| 6,658,422 | B1 | 12/2003 | Levanoni |
| 2001/0039519 | A1 * | 11/2001 | Richards ............ 705/27 |
| 2002/0032666 | A1 | 3/2002 | Kawamura |
| 2002/0116348 | A1 * | 8/2002 | Phillips et al. ............ 705/400 |
| 2002/0120492 | A1 * | 8/2002 | Phillips et al. ............ 705/10 |
| 2002/0156659 | A1 * | 10/2002 | Walker et al. ............ 705/5 |
| 2002/0161689 | A1 | 10/2002 | Segal |
| 2002/0178069 | A1 | 11/2002 | Walker et al. |
| 2003/0036928 | A1 * | 2/2003 | Kenigsberg et al. ............ 705/5 |
| 2003/0061179 | A1 * | 3/2003 | Reece ............ 705/412 |
| 2003/0187771 | A1 * | 10/2003 | Bulan ............ 705/36 |
| 2003/0225608 | A1 * | 12/2003 | Wu et al. ............ 705/10 |

FOREIGN PATENT DOCUMENTS

| | | |
|---|---|---|
| JP | 2131012 A2 | 5/1990 |
| JP | 5335656 A2 | 12/1993 |
| JP | 2002092249 A2 | 3/2002 |
| JP | 2002259779 A2 | 9/2002 |
| JP | 2002358472 A2 | 12/2002 |
| WO | WO-WO03052550 A2 | 6/2003 |
| WO | WO-WO03081385 A2 | 10/2003 |

OTHER PUBLICATIONS

Davis et al., "BLUR—the speed of change in the connected economy", Sep/Oct 2000, British Journal of Administrative Management, n22, PP: 20.*

Chmielewski, Dawn C., "San Francisco-Based Firm Develops Technology for Interactive TV", Apr. 19, 2001, KRTBN Knight Ridder Tribune Business News(san Jose Mercury News-California).*

Cohen, William W., "Fast Effective Rule Induction," Proceedings of the 12th International Conference on Machine Learning 1995, 10 pages.

Etzioni, Oren, et al., "To Buy or Not to Buy: Mining Airfare Data to Minimize Ticket Purchase Price," Proceedings of the Ninth ACM SIGKDD 2003, Aug. 24-27, 2003, Washington, D.C., 10 pages.

ITA Software, "Corporate Background," accessed Feb. 9, 2004, 1 page.

Muehlbauer, Jen, "Orbitz Reaches New Heights, Better technology results in a competitive advantage," CMP Media LLC, Apr. 2002, pp. 1-5.

Robinson, Sara, "Computer Scientists Find Unexpected Depths In Airfare Search Problem," Society for Industrial and Applied Mathematics, Jul./Aug. 2002, pp. 1-6.

Sutton, Richard S., et al., "Reinforcement Learning: An Introduction," MIT Press, Cambridge, MA, 1998, http://www-anw.cs.umass.edu/~rich/book/the-book.html, accessed May 5, 2004, pp. 1-3.

Ting, Kai Ming et al., "Issues in Stacked Generalization," Journal of Artificial Intelligence Research 10 (1999), pp. 271-289.

* cited by examiner

Example Historical Pricing Information Database

| Flight | Offer Price | Offer Time | Offer Class | Departure Date | Departure Time | Departure Location | Destination Location | Remaining Available Seats |
|---|---|---|---|---|---|---|---|---|
| AA192 | $350 | 12/15/XX 03:13pm | Y | 01/07/XX | 12:15pm | LAX | BOS | - |
| UA218 | $600 | 12/15/XX 03:14pm | Y | 01/07/XX | 11:30am | LAX | BOS | - |
| AA192 | $200 | 12/15/XX 03:14pm | Y | 01/08/XX | 12:15pm | LAX | BOS | - |
| AA563 | $275 | 12/15/XX 03:15pm | Y | 01/07/XX | 10:15pm | LAX | BOS | - |
| AA192 | $725 | 12/17/XX 10:15am | Y | 01/07/XX | 12:15pm | LAX | BOS | - |
| AA192 | $325 | 12/19/XX 02:38pm | Y | 01/07/XX | 12:15pm | LAX | BOS | - |
| ... | | | | | | | | |

FIG. 1A

Seattle, WA (SEA) to Boston, MA (BOS)    ⌐ 159

1 Choose a departing flight

Sort by:  ⦿Price   ⚬Shortest flights   ⚬Departure time

Note: The prices shown below are e-ticket prices and include all taxes and fees.   ⌐ 156
Hamlet Special Fare: Restrictions and limitations apply. Please review carefully.   155

--- from $499 Roundtrip                                              Hamlet Special Fare

| 8:50 am Depart Seattle (SEA) | Wed 11-Feb | Alaska Airlines 12 |
| Arrive Boston (BOS) 5:02 pm | Duration: 5hr 12mn | Nonstop flight |

➔ Choose this departure                                                                150a

--- from $598 Roundtrip                                                                157

| 8:07 am Depart Seattle (SEA) | Wed 11-Feb | United Airlines |
| Arrive Boston (BOS) 6:15 pm | Duration: 7hr 8mn | 1232/1216  Connect in Denver |

➔ Choose this departure                                                                150b

150

--- from $649 Roundtrip

| 8:50 am Depart Seattle (SEA) | Wed 11-Feb | Alaska Airlines 12 |
| Arrive Boston (BOS) 5:02 pm | Duration: 5hr 12mn | Nonstop flight |

➔ Choose this departure                                                                150c

--- from $678 Roundtrip

| 1:45 pm Depart Seattle (SEA) | Wed 11-Feb | American Airlines 230 |
| Arrive Boston (BOS) 9:50 pm | Duration: 5hr 5mn | Nonstop flight |

➔ Choose this departure                                                                150d

---

Change Search

*FIG. 1J*

Seattle, WA (SEA) to Boston, MA (BOS)

169

Your selected departure   Choose a different departure

| 8:50 am Depart Seattle (SEA)<br>Arrive Boston (BOS) 5:02 pm | Wed 11-Feb<br>Duration: 5hr 12mn | Alaska Airlines 12<br>Nonstop flight |

162

2 Choose a return flight

Note: The prices shown below are e-ticket prices and include all taxes and fees.
Hamlet Special Fare: Restrictions and limitations apply.   Please review carefully.

165

$499 Roundtrip                                                               Hamlet Special Fare

| 9:45 am Depart Boston (BOS)<br>Arrive Seattle (SEA) 12:54 pm | Mon 16-Feb<br>Duration: 6hr<br>21mn |  | Alaska Airlines<br>1551<br>Nonstop flight |

→ Choose this return   160a

165

160

$499 Roundtrip                                                               Hamlet Special Fare

| 5:49 pm Depart Boston (BOS)<br>Arrive Seattle (SEA) 9:10 pm | Mon 16-Feb<br>Duration: 6hr<br>21mn |  | Alaska Airlines 15<br>Nonstop flight |

→ Choose this return   160b

Change Search

*FIG. 1K*

Seattle, WA (SEA) to Boston, MA (BOS) ⌐ 179

Your selected departure  Choose a different departure  ⌐ 172

| 8:07 am Depart Seattle (SEA)<br>Arrive Boston (BOS) 6:15 pm | Wed 11-Feb<br>Duration: 7hr 8mn |  | United Airlines 1232/1216<br>Connect in Denver |

2 Choose a return flight

Sort by:  ⊙Price   ○Shortest flights   ○Departure time

Note: The prices shown below are e-ticket prices and include all taxes and fees.

Hamlet Fare Index: 🔼 means this fare is unlikely to fall but may rise. ⎬ 178

⌐ 177
| Hamlet Special Fare of $499 available. See flight options |
| Restrictions and limitations apply. Please review carefully. |
175

$598 Roundtrip 🔼                                Good Fare, Buy Now!

| 10:05 am Depart Boston (BOS)<br>Arrive Seattle (SEA) 3:33 pm | Mon 16-Feb<br>Duration: 8hr 28mn |  | United Airlines 221<br>1 stop |

Buy Price Protection for $10, and if the price drops after purchase, require the lower price! See details. ⎬ 176

Choose this return  170a

$649 Roundtrip

| 9:45 am Depart Boston (BOS)<br>Arrive Seattle (SEA) 12:54 pm | Mon 16-Feb<br>Duration: 6hr 21mn |  | Alaska Airlines 1551<br>Nonstop flight |

Choose this return  170b

170

$678 Roundtrip

| 1:26 pm Depart Boston (BOS)<br>Arrive Seattle (SEA) 7:15 pm | Mon 16-Feb<br>Duration: 8hr 49mn |  | American Airlines 1103/1301<br>Connect in Chicago |

Choose this return  170c

Change Search

*FIG. 1L*

Seattle, WA (SEA) to Boston, MA (BOS)

Your selected departure Choose a different departure

| 1:45 pm Depart Seattle (SEA) | Wed 11-Feb |  | American Airlines 230 |
|---|---|---|---|
| Arrive Boston (BOS) 9:50 pm | Duration: 5hr 5mn | | Nonstop flight |

2 Choose a return flight

Sort by:  ⦿Price  ○Shortest flights  ○Departure time

Note: The prices shown below are e-ticket prices and include all taxes and fees.

Hamlet Fare Index: Register now and Hamlet will tell you whether these fares are low or likely to rise in the days ahead.

Hamlet Special Fare of $499 available.  See flight options.
Restrictions and limitations apply. Please review carefully.

---

$598 Roundtrip                                            Is this a good fare?
                                                              Register now to find out

| 10:05 am Depart Boston (BOS) | Mon 16-Feb | | United Airlines 221 |
|---|---|---|---|
| Arrive Seattle (SEA) 3:33 pm | Duration: 8hr 28mn | | 1 stop |

→Choose this return

---

$649 Roundtrip                                            Is this a good fare?
                                                              Register now to find out

| 9:45 am Depart Boston (BOS) | Mon 16-Feb |  | Alaska Airlines |
|---|---|---|---|
| Arrive Seattle (SEA) 12:54 pm | Duration: 6hr 21mn | | 1551 Nonstop flight |

→Choose this return

---

$678 Roundtrip                                            Is this a good fare?
                                                              Register now to find out

| 1:26 pm Depart Boston (BOS) | Mon 16-Feb |  | American Airlines |
|---|---|---|---|
| Arrive Seattle (SEA) 7:15 pm | Duration: 8hr 49mn | | 1103/1301 Connect in Chicago |

→Choose this return

Change Search

*FIG. 1M*

Seattle, WA (SEA) to Boston, MA (BOS) ⎬ 189b

Your selected departure  Choose a different departure

| 8:07 am Depart Seattle (SEA) | Wed 11-Feb | | United Airlines 1232/1216 |
|---|---|---|---|
| Arrive Boston (BOS) 6:15 pm | Duration: 7hr 8mn | | Connect in Denver |

2 Choose a return flight

Sort by:  ⊙Price  ○Shortest flights  ○Departure time

Note: The prices shown below are e-ticket prices and include all taxes and fees.

Hamlet Fare Index: ⚂ means this fare is unlikely to fall but may rise.

| Hamlet Special ⚂ Fare of $499 available. See flight options. |
|---|
| Restrictions and limitations apply. Please review carefully. |

| ✈ $598 Roundtrip ⚂ | Buy Now – Price Not Likely to Drop and May Sellout Soon! | ⎬ 184a |
|---|---|---|

| 10:05 am Depart Boston (BOS) | Mon 16-Feb | | United Airlines 221 |
|---|---|---|---|
| Arrive Seattle (SEA) 3:33 pm | Duration: 8hr 28mn | | 1 stop |
| | | | ↪ Choose this return |

| ✈ $649 Roundtrip | Hold Off – Price Likely to Drop! | ⎬ 184b |
|---|---|---|

| 9:45 am Depart Boston (BOS) | Mon 16-Feb | | Alaska Airlines |
|---|---|---|---|
| Arrive Seattle (SEA) 12:54 pm | Duration: 6hr 21mn | | 1551 |
| | | | Nonstop flight |
| | | | ↪ Choose this return |

| ✈ $678 Roundtrip  ? | Price Unlikely to Change Much During Next 7 Days | ⎬ 184c |
|---|---|---|

| 1:26 pm Depart Boston (BOS) | Mon 16-Feb | | American Airlines |
|---|---|---|---|
| Arrive Seattle (SEA) 7:15 pm | Duration: 8hr 49mn | | 1103/1301 |
| | | | Connect in Chicago |
| | | | ↪ Choose this return |

Change Search

*FIG. 1N*

Seattle, WA (SEA) to Boston, MA (BOS)

1 Choose a departing flight

Sort by:  ◉ Price   ○ Shortest flights   ○ Departure time

Note: The prices shown below are e-ticket prices and include all taxes and fees.
Name Your Price: Restrictions and limitations apply. Please review carefully.

---

Name Your Price!

| 8:50 am Depart Seattle (SEA) | Wed 11-Feb | | Alaska Airlines 12 |
| Arrive Boston (BOS) 5:02 pm | Duration: 5hr 12mn | | Nonstop flight |

→ Choose this departure

--- from $598 Roundtrip

| 8:07 am Depart Seattle (SEA) | Wed 11-Feb | | United Airlines |
| Arrive Boston (BOS) 6:15 pm | Duration: 7hr 8mn | | 1232/1216 |
| | | | Connect in Denver |

→ Choose this departure

---

Change Search

*FIG. 10*

PERFORMING PREDICTIVE PRICING BASED ON HISTORICAL DATA

CROSS REFERENCE TO RELATED APPLICATIONS

This application claims the benefit of provisional U.S. Patent Application No. 60/458,321, filed Mar. 27, 2003 and entitled "Mining Historical Pricing Data To Provide Guidance For Current Purchases," which is hereby incorporated by reference in its entirety.

STATEMENT REGARDING FEDERALLY SPONSORED RESEARCH

The University of Washington and the University of Southern California have granted a royalty-free non-exclusive license to the U.S. government pursuant to 35 U.S.C. Section 202(c)(4) for any patent claiming an invention subject to 35 U.S.C. Section 201.

TECHNICAL FIELD

The following disclosure relates generally to the use of techniques for predicting future pricing information for items based on analysis of prior pricing information for the items, and more particularly to using such predicted future pricing information in a variety of ways, such as to assist users in making better buying and/or selling decisions.

BACKGROUND

In many situations, potential buyers or other acquirers of various types of items (such as products and/or services) are faced with difficult decisions when attempting to determine whether acquiring a particular item of interest under current conditions is desirable or optimal based on their goals, or whether instead delaying the acquisition would be preferable. For example, when the potential acquirer desires to obtain the item at the lowest price possible before some future date, and the item is currently offered by a seller for a current price, the potential acquirer needs to evaluate whether accepting the current price is more advantageous than the potential benefits and costs associated with waiting to see if the item will continue to be available and will be later offered at a lower price before the future date. Such potential acquisitions can include a variety of types of transactions (e.g., fixed-price purchase, auction-based purchase, reverse auction purchase, name-your-price purchase, rent, lease, license, trade, evaluation, sampling, etc.), and can be performed in a variety of ways (e.g., by online shopping using a computing device, such as via the World Wide Web or other computer network).

The difficulty of evaluating a potential current item acquisition is exacerbated in environments in which the prices of the items frequently change, such as when sellers or other suppliers of the items frequently modify item prices (e.g., in an attempt to perform yield management and maximize overall profits). In such environments, the likelihood of future price changes may be high or even a certainty, but it may be difficult or impossible for the potential acquirer to determine whether the future price changes are likely to be increases or drops, let alone a likely magnitude and timing of such changes. A large number of types of items may have such frequent price changes, such as airline tickets, car rentals, hotel rentals, gasoline, food products, jewelry, various types of services, etc. Moreover, a potential acquirer may in some situations need to evaluate not only a current price of an item of interest from a single seller or other provider, but may further need to consider prices offered by other providers and/or prices for other items that are sufficiently similar to be potential substitutes for the item of interest (e.g., airline flights with the same route that leave within a determined period of time, whether from the same airline or from competitor airlines).

In a similar manner, some sellers or other providers of items may similarly face difficulties in determining an advantageous strategy related to the providing of the items, such as for intermediary sellers that must acquire an item from a third-party supplier (e.g., an original supplier of the item or other intermediary seller) before providing it to a customer. For example, it may be difficult in at least some situations for such intermediary sellers to know what price to offer to customers in order to maximize profit, as well as whether to immediately acquire from a third-party supplier an item purchased by a customer or to instead delay such an acquisition in an attempt to later acquire the item at a lower price. In the context of the airline industry, for example, such intermediary sellers may include various types of travel agents, including travel agents that typically buy only single airline tickets in response to explicit current instructions from a customer, consolidators that buy large numbers of airline tickets in advance for later resale, tour package operators that buy large numbers of airline tickets for bundling with other tickets and/or services, etc.

Thus, it would be beneficial to be able to predict future pricing information for items, such as likely future directions in price changes and/or likely specific future item prices, as doing so would enable buyers and/or intermediate sellers to make better acquisition-related decisions.

DETAILED DESCRIPTION

Figure 1B:
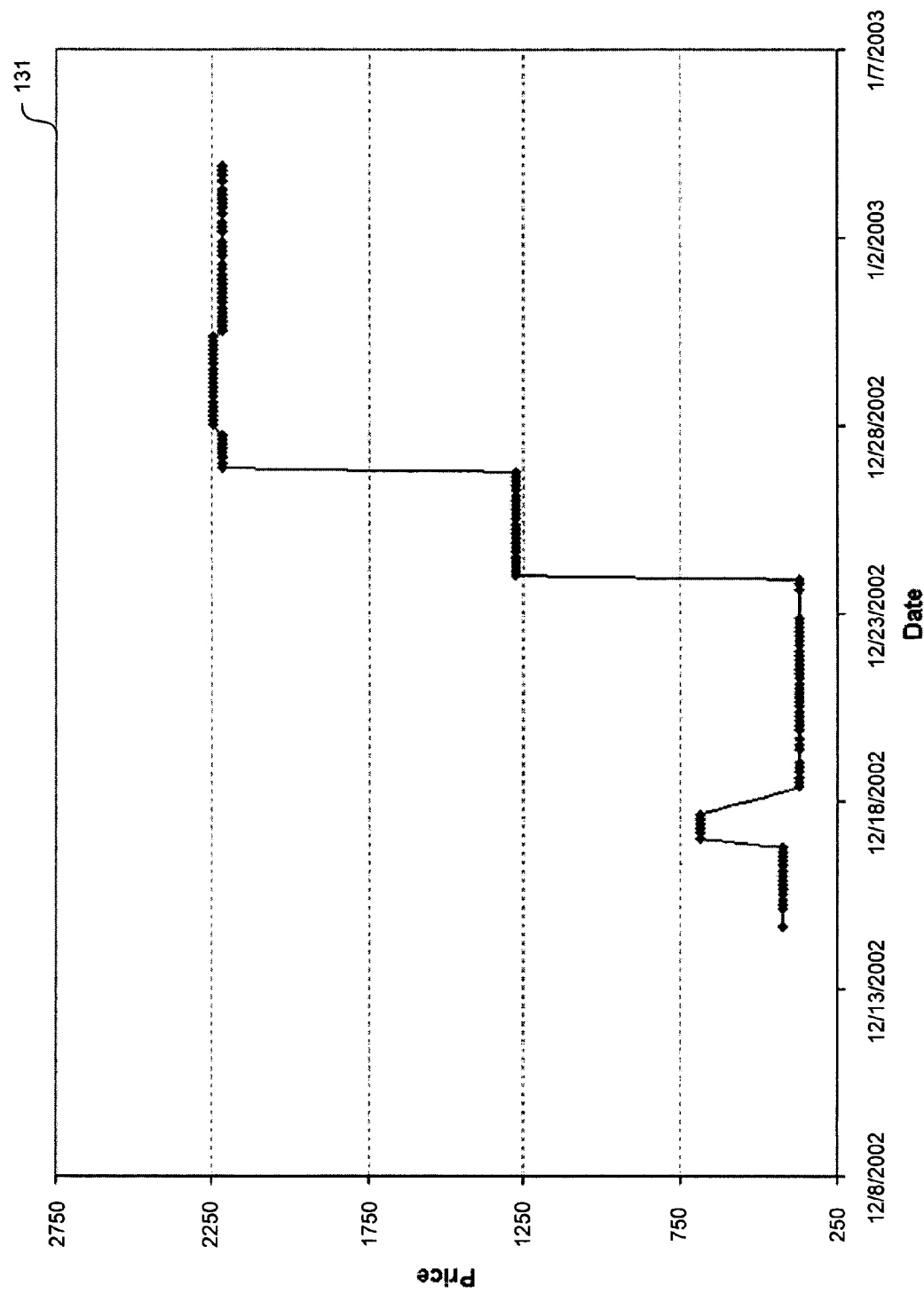
FIGS. 1A–1O provide examples illustrating the use of predictive pricing techniques in a variety of situations.

A software facility is described below that uses predictive pricing information for items in order to assist in evaluating decisions related to the items in various ways, such as to assist end-user item acquirers in evaluating purchasing decisions related to the items and/or to assist intermediate providers of the items in evaluating selling decisions related to the items.

In some embodiments, the predictive pricing techniques are used for items whose prices are dynamically changed by suppliers of the items to reflect various factors and goals, such as to use yield management and differential pricing techniques in an attempt to maximize profits—moreover, in some such embodiments the factors and/or any underlying pricing algorithms that are used by the item suppliers may further be unknown when performing the predictive pricing activities. Furthermore, in some embodiments the predictive pricing techniques may be applied to items that are "perishable" so as to have an expiration or other use date after which the item has a different value (e.g., a lower value, including no value), such as performances/events/occurrences and/or services that occur on or near the expiration or use date, or information whose value is based at least in part on its timeliness or recency—in such embodiments, a supplier of such an item may alter prices or other conditions for the item as its expiration or use date approaches, such as to discount a price for the item or alternatively to raise such a price. Any such actions by suppliers based on expiration or use dates for items may in some embodiments be performed by the suppliers in a purely formulaic and repeatable manner (e.g., as an automated process), while in other embodiments some subjective variability may be included with respect to such actions (e.g., based on manual input for or oversight of the actions). When discussed herein, a supplier of an item includes an original supplier of an item and/or any other party involved in providing of the item who has control over or influence on the setting of a current price for the item before it becomes available to an acquirer (whether an intermediate seller or an end-user customer), and may further in some situations include multiple such parties (e.g., multiple parties in a supply chain).

In particular, in some embodiments the predictive pricing for an item is based on an analysis of historical pricing information for that item and/or related items. Such historical pricing information analysis may in some embodiments automatically identify patterns in the prices, such as patterns of price increases or drops. In addition, in some such embodiments the analysis further associates the prices and/or patterns with one or more related factors (e.g., factors that have a causal effect on the prices or are otherwise correlated with the prices), such as factors that are automatically identified in one or more of a variety of ways during the analysis. Furthermore, in some embodiments predictive pricing policies are also automatically developed based on other automatically identified predictive pricing information, such as to enable specific price-related predictions for a particular item given specific current factors. In addition, in some embodiments the historical pricing information may reflect prices for items that were previously offered by item suppliers to others, while in other embodiments the historical pricing information may reflect prices at which the items were actually previously acquired/provided. Specific mechanisms for performing such predictive pricing analysis are discussed in greater detail below.

When such predictive pricing information is available for an item, that information can then be used to assist acquirers (e.g., buyers) and/or intermediate providers (e.g., sellers) of an item in making better decisions related to acquiring and/or providing of the item. In particular, given information about current factors that are associated with the pricing information for the item, the predictive pricing information for the item can be used to make predictions about future pricing information for the item. Such future predicted pricing information can take various forms in various embodiments, including a likely direction of any future price changes, a likely timing of when any future price changes will occur, a likely magnitude of any future price changes, likely particular future prices, etc. In addition, in some embodiments the future predicted pricing information may further include predictions of the specific likelihood of one or more of such types of future pricing information. Moreover, in some embodiments and/or situations the predictive pricing information and/or assistance/functionality provided based on that information may be performed for a fee.

As one example, the facility may in some embodiments use predictive pricing information for items to advise potential buyers of those items in various ways. For example, when providing pricing information for an item to a current customer, a notification may in some embodiments be automatically provided to the customer to advise the customer in a manner based on predicted future pricing information for the item, such as whether the current price is generally a "good buy" price given those predicted future prices, or more specifically whether to buy immediately due to predicted future price increases or to delay buying due to predicted future price drops. Such advice could further in some embodiments provide specific reasons for the provided advice, such as based on information about specific predicted future pricing information (e.g., a specific predicted direction, time and/or magnitude of a future price change, a specific predicted future price, etc.), as well as additional details related to the advice (e.g., specific future conditions under which to make an acquisition, such as a specific amount of delay to wait and/or a specific future price to wait for). In situations in which the potential buyer does not need to immediately obtain the item and the predicted future pricing information indicates that the price is likely to drop, for example, the potential buyer can use that information to determine to delay a purchase.

In other situations, advice may be automatically provided to a user in other ways, such as by proactively alerting a potential buyer regarding a current and/or predicted future price for an item (e.g., an item in which the customer has previously expressed an interest), such as when a current price for the item reflects a good buy for the customer. In addition, in some embodiments the facility may further act as an agent on behalf of a customer in order to automatically acquire an item for the customer, such as based on prior general instructions from the customer related to purchasing an item or type of item when it is a good buy. Thus, in some embodiments such advice may be provided to users as part of an interactive response to a request, while in other situations the providing of the advice may instead be automatically initiated. In addition, in some embodiments and/or situations the providing of such advice and/or related functionality to a potential buyer or other acquirer may be performed for a fee, such as a fee charged to that acquirer.

In other embodiments, the facility may act on behalf of an intermediate seller of the item in order to provide advice to the seller. For example, in some situations in which a predicted future price for an item is lower than a current price, the intermediate seller may determine based on such advice to offer a price to a customer that is lower than the current price available to the intermediate seller (e.g., but above the lower predicted future price)—if so, and if the customer indicates to purchase the item, the intermediate seller may further delay purchasing the item from its supplier in order to attempt to acquire the item at a lower future price. More generally, when a predicted future price for an item is lower than a current price being offered to an intermediate seller, that knowledge about the lower predicted price may enable the intermediate seller to currently use the potential cost savings based on acquisitions at the later lower price in a variety of ways, including by passing some or all of the price difference on to customers, by retaining some or all of the price difference as profit, and/or by sharing some or all of the price difference with the supplier of the item to the intermediate seller (e.g., in exchange for the supplier immediately lowering their price to the intermediate seller).

In addition, in situations in which the future price is predicted not to drop, the intermediate seller may choose based on such advice to offer price protection to a customer (e.g., for a fee to the customer) based on that prediction, such as to provide additional benefit to the customer if the future actual price were to drop below the current price or some other specified price (e.g., a refund of the difference). In other embodiments, the facility may assist the intermediate seller to offer items to customers using a variety of other sales models, such as to allow customers to name a price at which the customer will purchase an item of interest (whether identified as a particular item or a category of items that is specified at any of a variety of levels of details) and to then assist the intermediate seller in determining whether to accept such an offer based on a comparison of the named price to a predicted future price for the item. In addition, in some embodiments and/or situations the providing of such advice and/or related functionality to intermediate sellers and other providers may be performed for a fee, such as a fee charged to that provider.

In addition, the facility may in some embodiments further assist buyers that purchase items in bulk (e.g., by aggregating numerous individual purchases into one), such as customers that themselves buy large numbers of the items (e.g., large corporations) and/or intermediate sellers (e.g., item consolidators) that are purchasing items from other suppliers. In such situations, the bulk purchaser may take a variety of types of steps to accomplish desired goals of the purchaser, such as to hedge or otherwise limit exposure to loss based on predicted future prices (e.g., by purchasing some but not all of multiple items at a current price even when the predicted future price is lower in order to minimize the risk of the actual future prices being higher than the current price). Alternatively, the bulk purchaser may be able to use information about predicted future prices to manually negotiate better current prices with a seller. In other embodiments, information about such predicted future prices can assist other types of users, including suppliers of items when they have such information about similar items offered by competitors, such as to provide first mover advantage for price decreases that are likely to occur in the future by the competitors. The information provided by the analysis may further assist in some embodiments in more generally identifying and predicting trends in prices over time for specific items and/or groups of related items, such as to enable a user to immediately take action in such a manner as to benefit from such trends. In addition, in some embodiments and/or situations the providing of such advice and/or related functionality to bulk purchasers may be performed for a fee, such as a fee charged to that bulk purchaser.

In some embodiments, the facility further assists users in analyzing historical purchase data, such as for bulk purchasers. For example, a large corporation may want to analyze their prior item purchases over a specified period of time in order to determine whether the purchase prices for the items were advantageous and/or optimal in light of later available prices for those items. In some situations, the actual prior purchase prices for items could be compared against alternative prior purchase prices for those items that would have been obtained based on following predictive pricing information for those items that would have been provided at the time of actual purchase (e.g., for advice related to delaying a purchase, determining a difference between the actual prior purchase price and a later actually available price at which the item would likely have been acquired based on the advice). This allows a determination to be made of the benefits that would have been obtained by using predictive pricing in those situations. In addition, in some embodiments the actual prior purchase prices could further be compared to optimal purchase prices for those items within a relevant time period before the item was needed, such as to see the differential (if any) between the actual purchase price and the lowest possible purchase price given perfect hindsight knowledge. In addition, in some embodiments and/or situations the providing of such advice and/or related functionality for analyzing historical purchase data may be performed for a fee, such as a fee charged to a customer to whom the historical purchase data corresponds.

Moreover, such analysis of prior purchase decisions provides information not only about the benefits of using the predictive pricing techniques, but also to assist in further refining the predictive pricing techniques (e.g., in an automated manner, such as based on a learning mechanism), such as based on identifying situations in which the predictive pricing techniques did not provide the best prediction available.

In addition, in various embodiments the predictive pricing information and/or related functionality is used to generate revenue and/or produce savings in a variety of ways, including through service fees, license fees, by maximizing profit for sellers and/or savings for acquirers, through related advertising, etc. Such revenue can be based on any or all of the various example types of functionality discussed above and in greater detail below.

For illustrative purposes, some embodiments of the software facility are described below in which particular predictive pricing techniques are used for particular types of items, and in which available predictive pricing information is used to assist buyers and/or sellers in various ways. However, those skilled in the art will appreciate that the techniques of the invention can be used in a wide variety of other situations, and that the invention is not limited to the illustrated types of items or predictive pricing techniques or uses of predictive pricing information. For example, some such items with which the illustrated predictive pricing techniques and/or uses of predictive pricing information include car rentals, hotel rentals, vacation packages, vacation rentals (e.g., homes, condominiums, timeshares, etc.), cruises, transportation (e.g., train, boat, etc.), gasoline, food products, jewelry, consumer electronics (e.g., digital and non-digital still and video cameras, cell phones, music players and recorders, video players and recorders, video game players, PDAs and other computing systems/devices, etc.), books, CDs, DVDs, video tapes, software, apparel, toys, electronic and board games, automobiles, furniture, tickets for movies and other types of performances, various other types of services, etc. Furthermore, the disclosed techniques could further be used with respect to item-related information other than prices, whether instead of or in addition to price information.

FIGS. 1A–1O provide examples illustrating the use of predictive pricing techniques in a variety of situations. In these examples, the predictive pricing techniques are applied to airline ticket information and are used by a provider of information about airline ticket prices, such as an intermediate seller travel agency. However, such techniques can also be used for other types of items and in other manners, as discussed elsewhere.

In particular, FIG. 1A illustrates a table 100 that provides examples of historical pricing information that may be gathered for airline flights and then analyzed to produce various types of predictive pricing information. In this example, the table includes entries 111–116 that each correspond to a different instance of actual price information for a particular flight, such as a ticket price offered for a flight at a particular time. The table also includes columns 102–104 that store information about the specific offer instance for the flight number indicated in column 101 and the departure date indicated in column 105. In addition, in the illustrated embodiment the table further includes columns 106–108 with additional information about the flight, although in other embodiments such information may be stored separately. Moreover, in some embodiments the table could store additional information about other factors that may have an effect on price changes, such as one or more sell-out factors related to whether/when a flight may sell out (e.g., based in part on a number of remaining available seats in column 109, although in the illustrated embodiment that information is not currently available).

While the flight prices reflect one-way tickets for specific flights of specific airlines in this example, related information could similarly be gathered and/or aggregated in various other ways, whether instead of or in addition to one-way tickets, including for round-trip and/or multi-segment tickets, and so as to enable predictive pricing for flights on a particular route between a departure airport and an arrival airport, for flights on one or more routes between a particular pair of cities or regions (e.g., when the departure and/or arrival cities/regions include multiple airports), for flights into and/or out of an airport hub for one or more airlines, for flights on a route with an associated time (e.g., a specified departure time or departure time range, a specified arrival time or arrival time range, a specified interval of time for the travel, etc.), for some or all flights from a particular airline, for some or all flights into or out of an airport and/or city/region, for some or all flights that depart and/or arrive at a specified airport/city/region within a specified time frame, etc.

FIG. 1B illustrates a chart 131 that provides an example of historical offer price information over time for a particular airline flight, such as a flight that departs in this example on January 7, and is represented with a particular flight number from a particular airline (not shown). As one example, the illustrated price information may correspond to a group of historical information that includes entries 111 and 115–116 of table 100 in FIG. 1A. In other embodiments, information could instead be analyzed for airline flights in other ways, such as by aggregating information for a particular airline route over multiple days and/or by aggregating information for multiple airline flights of a particular airline or that are otherwise similar. In this example, the price data generally shows three tiers of relatively stable prices, although there is an additional small price fluctuation in the first price tier around the dates of December 17 and December 18 (e.g., based on a reaction of the airline to a temporary price increase by a competitor on a flight for the same route and date).

Figure 1C:
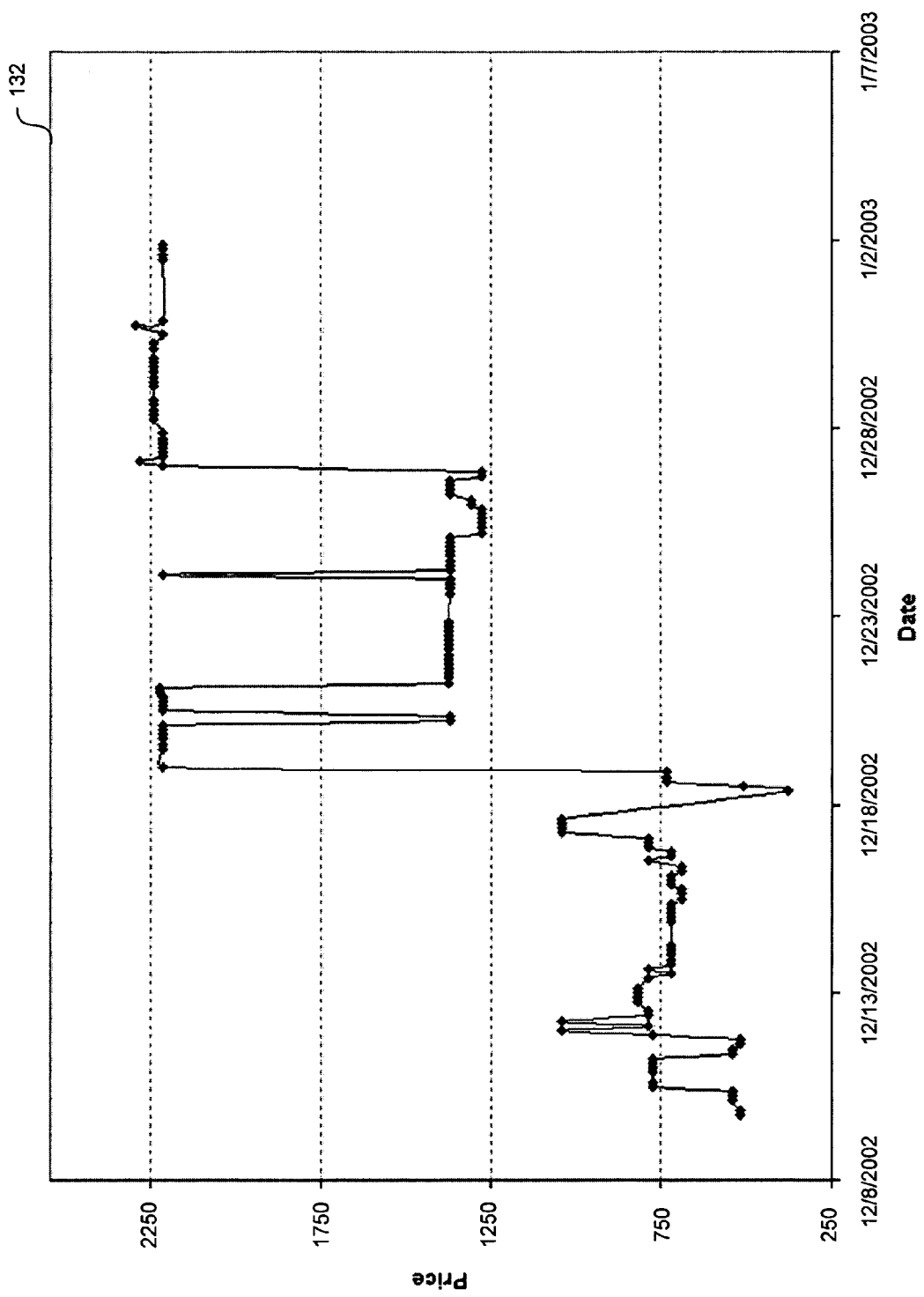

FIG. 1C illustrates a chart 132 that provides an example of historical price information for the same flight except with a different departure date that is five days earlier, which in this example results in a departure date of January 2 rather than January 7. Despite the similarities between the two flights (the same airline, flight number, route and close departure date), the price of this airline flight with the earlier departure date fluctuates much more than that of the flight discussed with respect to FIG. 1B, such as based at least in part on the increased demand for travel near the New Year holiday.

Figure 1D:
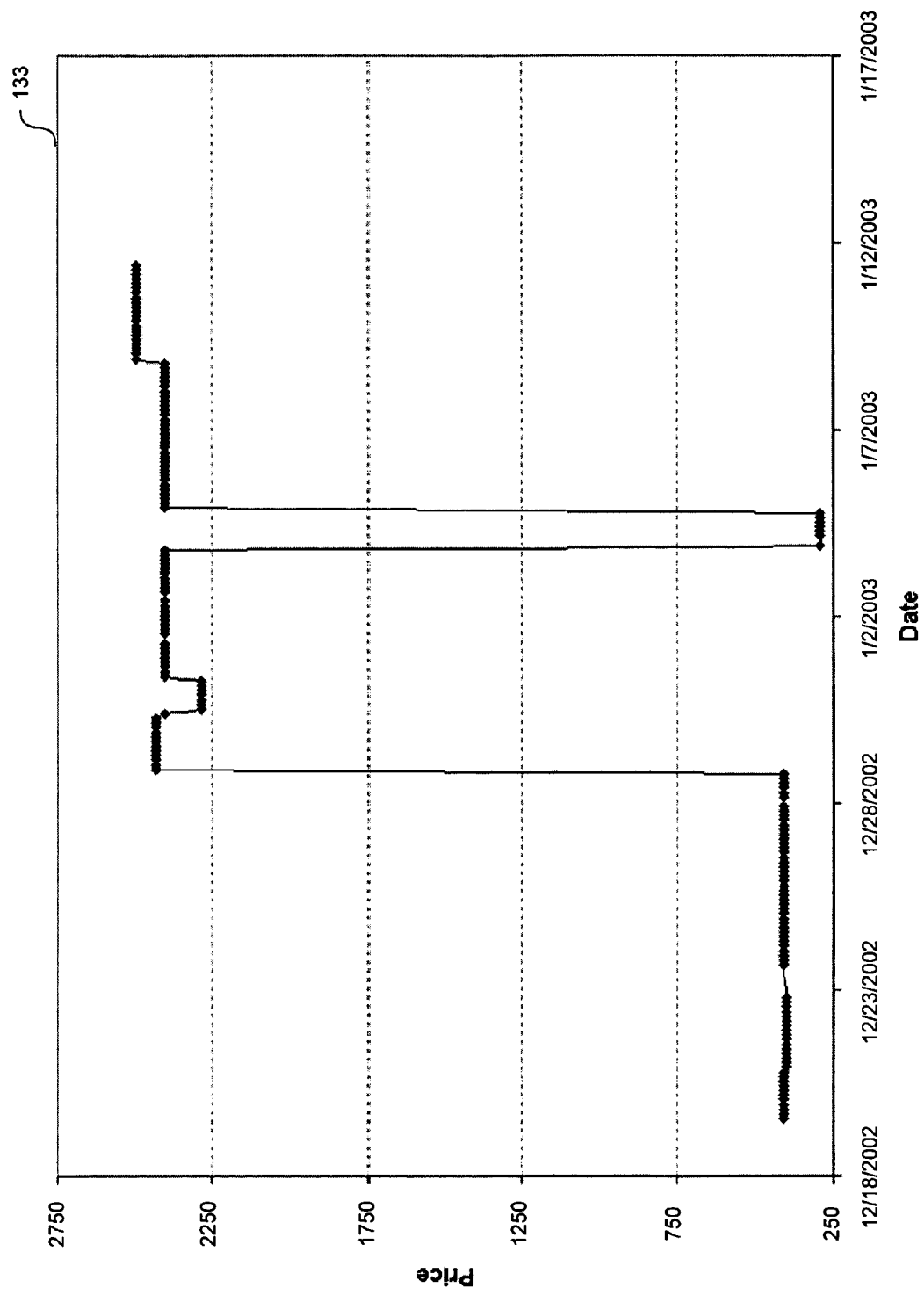
Figure 1E:
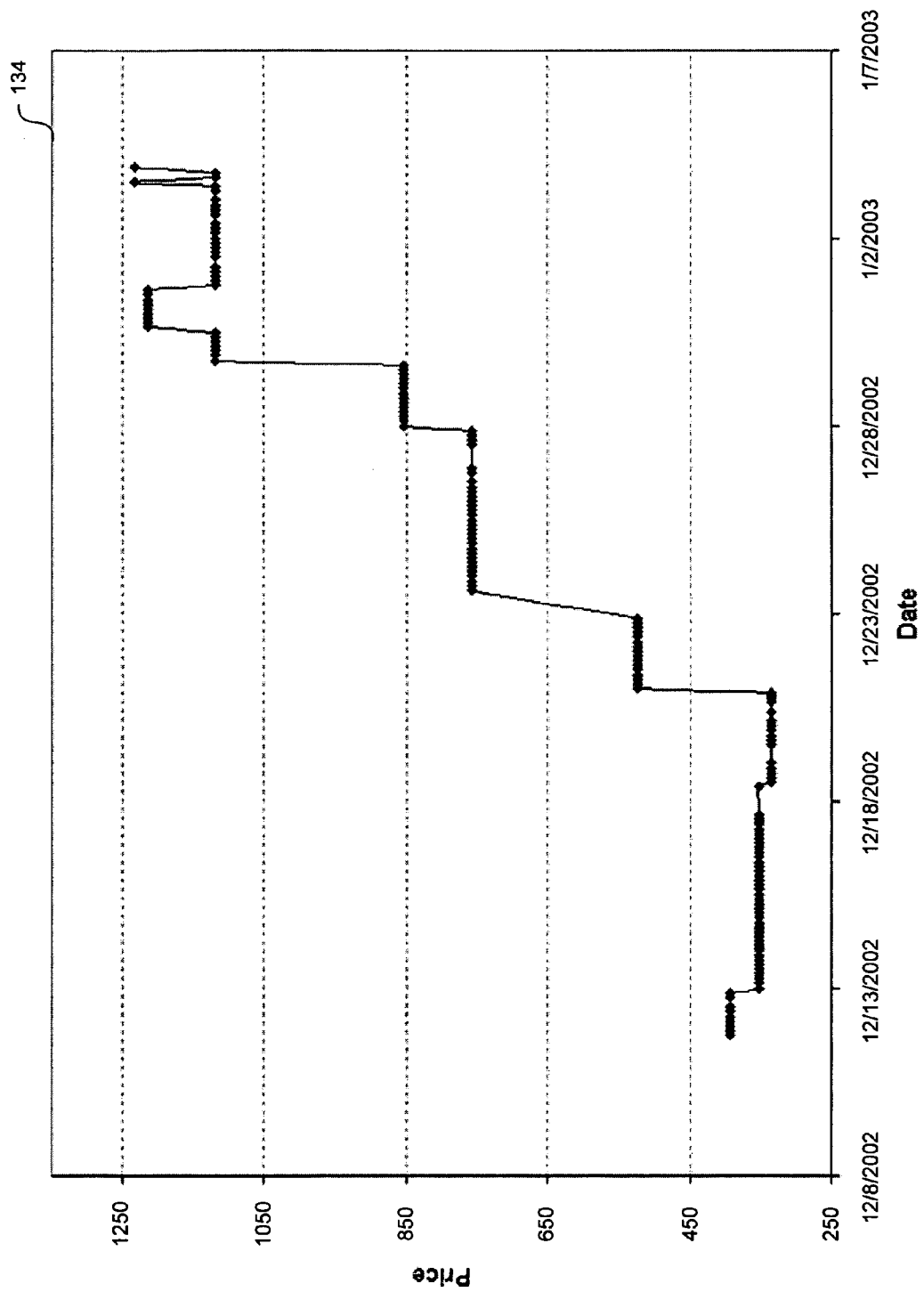

FIG. 1D illustrates an example of a chart 133 that provides an example of historical price information for a different airline flight, such as on a different route and/or from a different airline. In this example, there are two primary price tiers, but there is also a large drop in price in the middle of the second price tier (near the date of January 5 in this example). Thus, customers who express interest in the item near the beginning of the second price tier (e.g., around the dates of December 30–January 3) might pay a large price if they purchased immediately, but could significantly benefit by waiting to purchase the ticket during the later price drop. FIG. 1E illustrates yet another example chart 134 with example historical price information, which in this example shows a more gradual increase in price over time as the departure date approaches. A variety of other types of price change behavior could similarly occur.

Figure 1F:
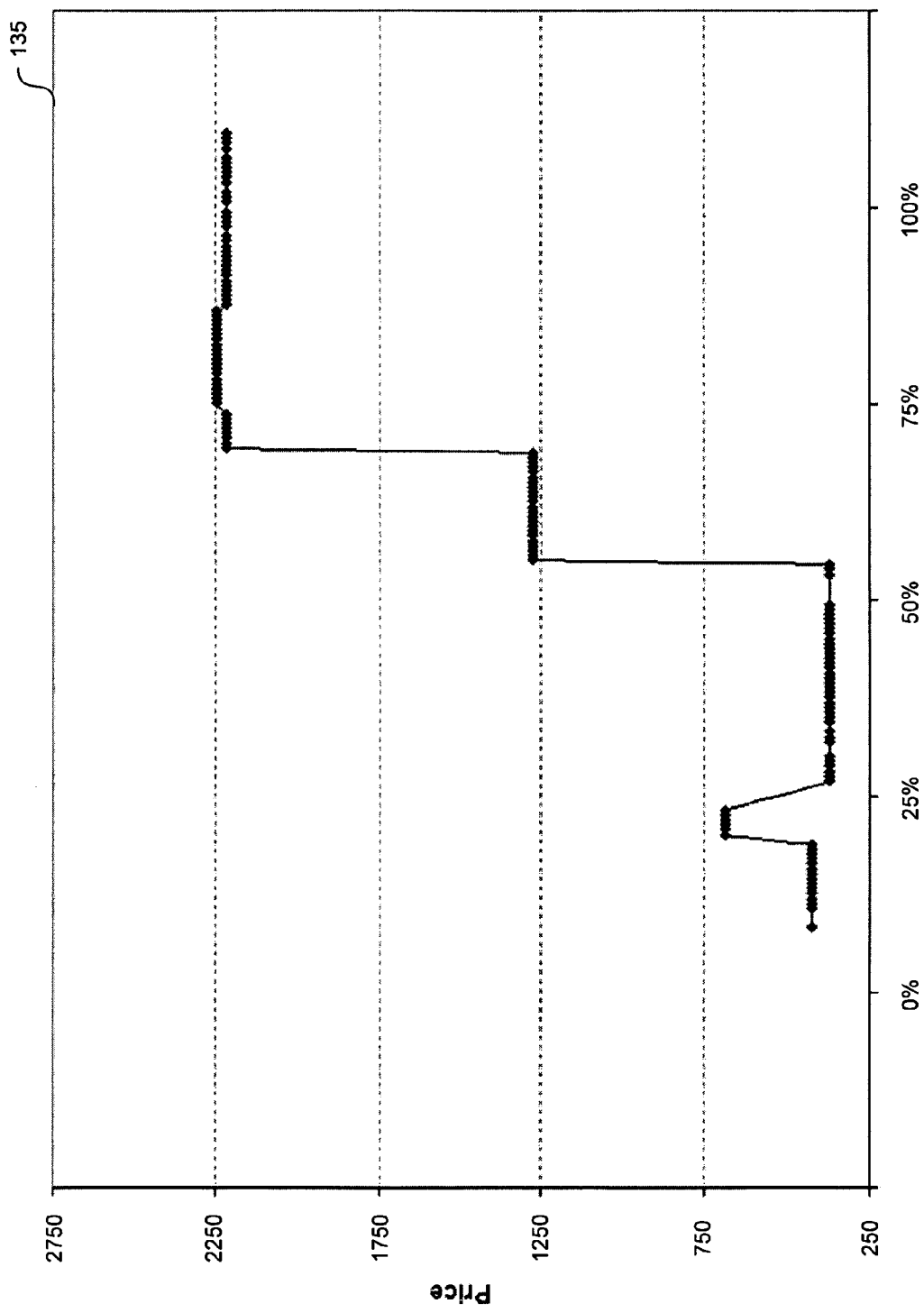

As illustrated in these examples, prices for airline tickets can change in various ways and based on various factors. For example, information other than an amount of time before departure can be a factor that affects price changes in at least some embodiments, and can thus be used as part of a later predictive pricing determination in those situations. For example, FIG. 1F illustrates an example chart 135 for the same flight previously discussed with respect to FIG. 1B, although in this example the price is shown as it varies based on factor of the availability of remaining seats on the flight. In other embodiments, however, such flight availability factor information may not be available and/or other additional factors could similarly be considered.

Figure 1G:
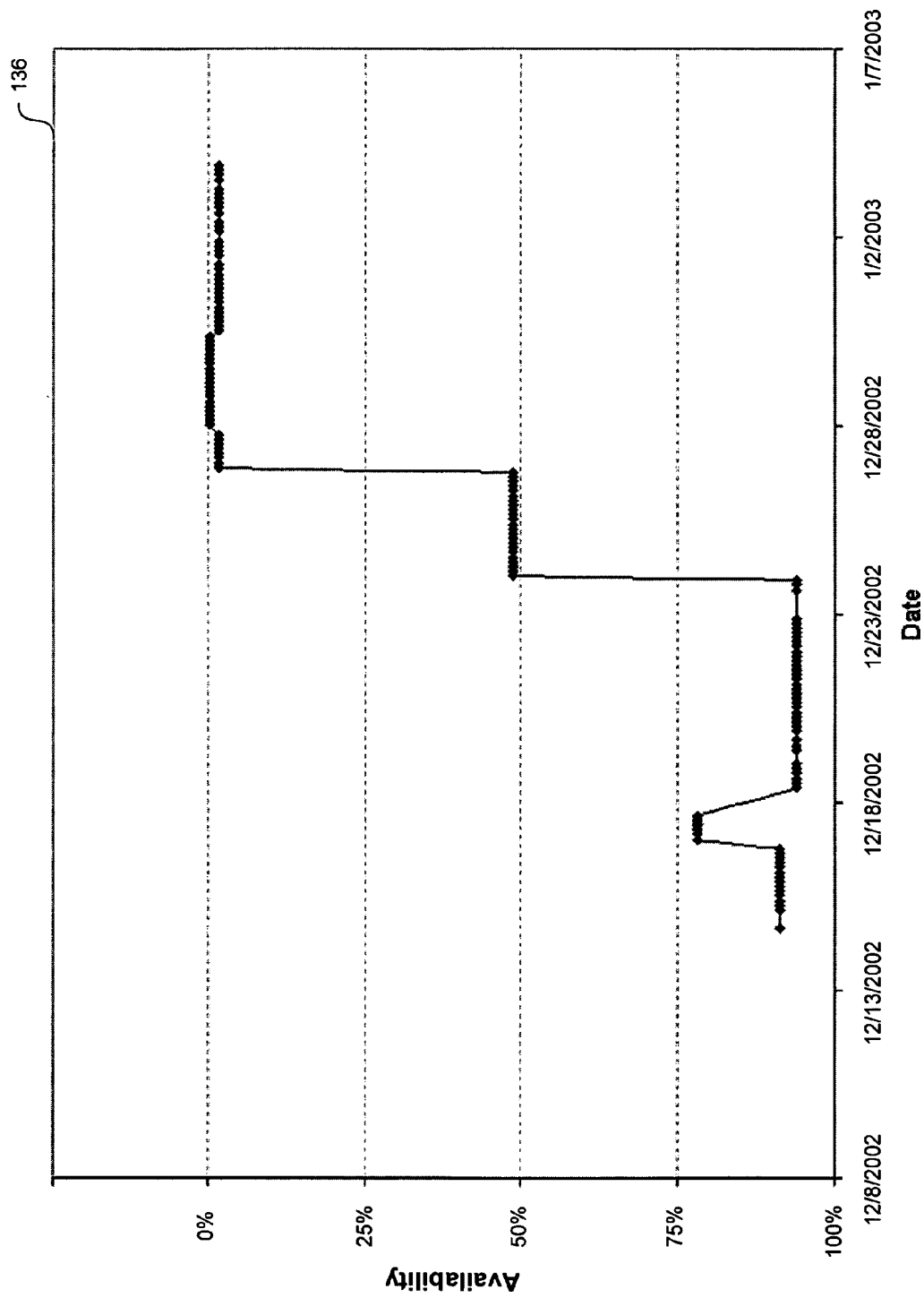

In a similar manner, the example chart 136 illustrated in FIG. 1G illustrates that information other than price may be tracked, analyzed and used in some embodiments, such as in this example displaying historical flight availability information for one or more flights (e.g., flights that depart on a particular day or instead on any of a group of similarly situated days). Such availability information may then be used in some embodiments to assist in a determination of whether a current price is currently a good buy, such as based on considering the likelihood of the flight selling out in the future. However, in embodiments where the price of an item typically already varies based on remaining availability, such as for airline tickets, availability information may instead be considered implicitly based merely on the price factor (e.g., if the availability does not independently affect a decision).

Figure 1H:
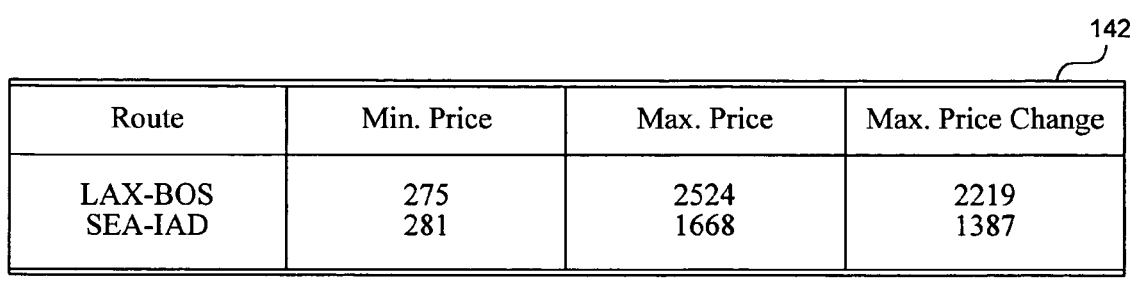
Figure 1I:
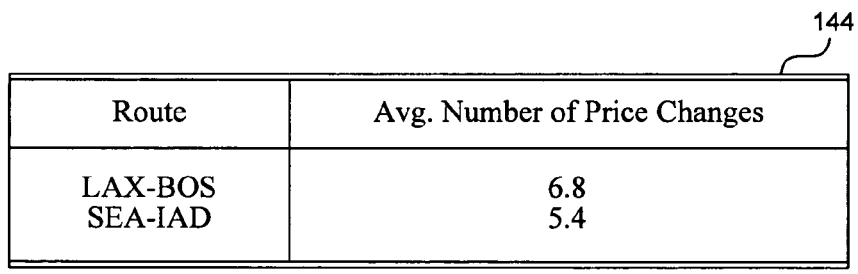

Thus, as previously indicated, historical price information for airline ticket prices can be illustrated in a graphical manner to show changes over time as the departure time nears. In addition, such historical data can also be analyzed in a variety of ways to provide other types of information that can assist in later performing predictive pricing. For example, with respect to FIG. 1H, example information is shown in table 142 that indicates a historical minimum price, maximum price, and maximum price change for particular routes. Similarly, FIG. 1I illustrates in table 144 an average number of price changes for particular routes. A variety of other types of analyses can similarly be performed related to price changes if the resulting information assists in predictive pricing and/or in providing advice based on current prices.

Once predictive pricing information is available, it can be used in a variety of manners to assist potential acquirers and/or providers of items. For example, FIG. 1J illustrates example information 159 that provides flight alternative information to a potential customer, such as via a Web page provided to the customer for display from an online travel agent. In this example, the provider of information is referred to as "Hamlet". In particular, in this example four alternative flight options 150 are displayed to the customer, such as by including them in search results in response to a prior request from the customer. The alternatives are listed in order from lowest price to highest price in this example, with the lowest price being $499 for alternative 150*a*. However, in this example the low price for alternative 150*a* corresponds to a special fare that is being offered to the customer by the travel agent, as is indicated to the customer in this example via notification 155 and is explained more fully to the customer if they select the control 156. In particular, alternative 150*a* corresponds to the same flight as that for alternative 150*c*, but the indicated price of $649 for alternative 150*c* reflects the actual price currently offered by the original supplier of this flight (in this example, Alaska Airlines). The special fare offered in this example for alternative 150*a* is instead based on predictive pricing for this flight, which in this example has provided an indication that a future price for this flight will be lower (e.g., as low as $499 if the travel agency plans to offer the full potential savings to the customer, lower than $499 if the travel agency plans to retain some of the potential savings, somewhat above $499 if the travel agency is willing to offer an additional discount to this customer and/or in this situation, etc.).

Thus, in this example the travel agency has elected to provide at least $150 worth of potential savings to the customer if the customer purchases now by offering a price to the customer that is lower than the price currently offered from the original supplier. If the customer then proceeds to purchase the flight for alternative 150*a* at the special fare, such as by selecting control 157, the travel agency may nonetheless wait until later to actually purchase a ticket for the customer on this flight, such as a later time when the actual price offered by the item supplier is lower. In this example, the customer is selecting a round-trip flight, and thus after selecting the control 157 for alternative 150*a* the customer will be prompted to provide information related to a return flight. If the customer was instead selecting a one-way trip or this was the last selection of a trip with multiple legs or segments, selection of a corresponding control by the customer could instead prompt the online travel agency to provide confirmation to the customer of their purchase having been completed at the indicated price of $499, even if the travel agency delays a purchase of tickets for the flight until later.

In other embodiments, explicit notification that the alternative 150*a* is a special fare might instead not be provided, such as by not showing alternative 150*c* with the actual current price offered by the original supplier airline, and instead merely listing a price for alternative 150*a* that is selected as satisfying one or more goals of the travel agency, such as to maximize profit (e.g., a price that is between the lowest predicted future price and the lowest actual current price offered by a supplier for one of the alternatives, such as in this example to be less than the $598 price for alternative 150*b*). Conversely, in some embodiments additional aspects related to the special fare may be conveyed to the customer, such as if any special fares selected by the customers for purchase are contingent on the travel agency acquiring the ticket under specified conditions (e.g., at or below a specified price and/or within a specified amount of time). If so, the travel agency may not confirm purchase to the customer until after the ticket is actually acquired from a supplier.

FIG. 1K illustrates example information 169 that provides return flight information to the customer after selection of control 157 in FIG. 1J, including information 162 about that previously selected flight. The information includes two alternative return flights 160, with both of the alternatives in this example including a notification 165 that the indicated prices are special fares from the travel agent. In some embodiments, such notifications may further explicitly indicate to a customer that a special fare is based on predictive pricing, while in other embodiments such information may not be provided to the customer.

FIG. 1L illustrates example information 179 that provides alternative return flight information to the customer if the customer instead selected alternative 150*b* in FIG. 1J for the initial segment of the trip, including information 172 about that previously selected flight. In this example, three alternative return flights 170 are included, and an additional notification 177 is provided to the customer to remind them that a lower price trip is available based on the special fare offered by the travel agency. In addition, in this example the travel agency provides various other types of notifications based on the use of predictive pricing. For example, as indicated in information 178 and with notification 175, the current price of $598 round trip for flight alternative 170*a* is indicated in this example to be a good buy that may justify immediate purchase, such as due to the price being unlikely to fall but may possibly rise in the near future. In other embodiments, customers may instead be referred to an agent or a supplier from whom they can immediately acquire such good buy tickets, such as in exchange for a referral fee. In addition, in this example the travel agency further provides an option 176 to the customer that is also based on predictive pricing information—in particular, since in this example the predictive pricing indicates that the price is not likely to drop, the travel agency is willing to offer price protection insurance to the customer for a small fee, such that if the actual offered price drops after purchase the customer would then receive an additional benefit (e.g., a discount on their purchased price so as to reduce it to the lowest actual price that was offered). While the price protection insurance is offered to the customer for an additional fee in this example, in other embodiments such price protection insurance may not be offered or instead may be offered to a customer without additional explicit cost to the customer.

FIG. 1M illustrates example information 189*a* that provides return flight information to the customer if the customer instead selected alternative 150*d* in FIG. 1J for the initial segment of the trip, including information 182 about that previously selected flight. In particular, in this example three alternative return flights 180 are provided to the user, and predictive pricing information allows the travel agency to determine whether some or all of the alternatives are good fares or are otherwise good buys. However, in this example such additional information based on predictive pricing is available only to registered customers, and thus the information 189*a* includes indications 181*a*–181*c* to the user that they can obtain such notification information after they register (e.g., via selection of the control in section 183), such as based on a fee charged to the customer (e.g., a one-time fee or an ongoing subscription), or instead based on other benefits to the travel agency of such registration (e.g., obtaining additional information about the customers for use in better serving them and/or tailoring advertising or other information that will be displayed or otherwise provided to them). Alternatively, the initial registration may be free and may provide a basic level of information to a customer, while an upgrade to one or more premium fee-based registration services with additional information and/or functionality (e.g., to provide details and/or reasons about notifications, to provide alerting functionality, etc.) may additionally be available. Different types of services could also be used for different types of customers, such as individuals purchasing on their own behalf versus users acting on behalf of others (e.g., travel agents, corporate travel managers, etc.).

As noted above, in some embodiments and situations revenue may be derived through various types of advertising to users, such as advertising supplied interactively to users along with other supplied information (e.g., as banner or pop-up ads, sponsored listings in search results, paid inclusion for search or other results, etc.), advertising supplied or otherwise made available to users in a non-interactive manner (e.g., permission-based or other email or other forms of notification) such as based on demographic and/or personal preference information for the users, etc. Similarly, in some embodiments and situations revenue may be derived through other uses of information about users themselves and/or about purchase-related activities of such users, including selling or otherwise providing such information to third-parties (e.g., with permission of the users).

FIG. 1N illustrates information 189*b* that is similar to that displayed with respect to FIG. 1M, but which includes alternative types of notifications to the customer for the return flight alternatives. For example, these alternative notifications may be provided to the customer after they complete the registration process with respect to FIG. 1M. In particular, example notification 184*a* provides additional information to a user for a particular flight, such as to buy the flight at the current price now because the price is not likely to drop and the flight may soon sell out. Conversely, notification 184*b* indicates to the customer to hold off on purchasing the indicated flight at its current price, as the price of that flight is likely to drop in the future. Notification 184*c* indicates for its alternative flight that the price is not likely to rise or drop, and thus advice on whether to purchase immediately cannot be made based purely on price information. In other alternatives, yet other types of information could be provided, such as by including information in alternative 184*b* that further indicates to the customer a length of time that the customer should wait before purchasing and/or a price or price range for which the customer should wait before completing the purchase.

While not illustrated here, advice could also be provided to customers in a variety of ways other than as part of an interactive response to the customer. For example, various types of alerts could instead be provided to a customer in a manner initiated by the travel agency or a related system with access to the airline price information, such as for alternative 150*a* in FIG. 1J if the customer had previously requested information on special fares for this flight or on fares below $500 for any flights between Seattle and Boston. Such alerts could take a variety of forms, including e-mail, instant message, a phone call, fax, etc. In addition, in other alternatives the travel agent and/or an independent agent acting on behalf of the customer could automatically purchase a flight when it met certain criteria for the customer, including if the flight is determined to be a good buy.

FIG. 1O illustrates example information 199 showing another alternative for using predictive pricing information to assist customers and/or sellers. In particular, in this example information is shown that is similar to that illustrated in FIG. 1J, but with only two alternatives illustrated to the customer. The top alternative in this example corresponds to the same flight that was previously indicated to be alternative 150*a* in FIG. 1J, but in this example a specific special fare is not offered to the customer based on the predictive pricing. Instead, as indicated by the customer-selectable control 193, the customer is in this example offered the opportunity to offer a named price for the particular flight shown. In addition, the displayed information to the customer further includes an indication of a second alternative flight, which in this example does not include the name-your-price functionality, although the specific offered price does provide context to the customer of other current prices offered for competitive flights—in other embodiments, such additional information may instead not be provided. In this example, if the customer selects the control 193 and offers a price above $499 (the special fare in FIG. 1J for this flight), the travel agency may accept that offer even though it is below the current price offered for the flight of $649. In other alternatives, customers could name prices for flights at varying degrees of specificity, such as any flight that is sufficiently similar to previously indicated search criteria by the customer, flights on a specified airline but not limited to a particular flight, etc. In addition, customers could similarly purchase items using other purchase models that similarly use predicted price information, such as based on various auction-related purchase models.

Thus, FIGS. 1J–1O provide examples of specific types of functionality that may be provided to customers by intermediate sellers based on the use of predictive pricing information, although in other embodiments such predictive pricing information could be used in other ways. Also, as was shown in these examples, the predictive pricing information allows different types of functionality to be offered to different types or categories of customers. For example, the special fares and general notifications of whether a flight is a good buy may be of interest to bargain and value shoppers. Similarly, the name-your-price model may allow such customers to save money, while also being able to specify flights at a much more detailed level than is currently provided in the marketplace (e.g., by Priceline), which provides less uncertainty and less restrictions for the customers. Conversely, frequent travelers may prefer to obtain additional information related to predictive pricing, such as details and/or reasons related to why a flight is a good buy, or specific recommendations on how to obtain potential savings when the future price may drop—if so, such additional information may be available to them for an additional fee, such as based on a premium registration service. In addition, professionals that represent other travelers (e.g., travel agents, in-house corporate travel managers, etc.) may want even more information and/or the ability to obtain predictive pricing information in high volume and/or in bulk, such as for additional fees.

Figure 2:
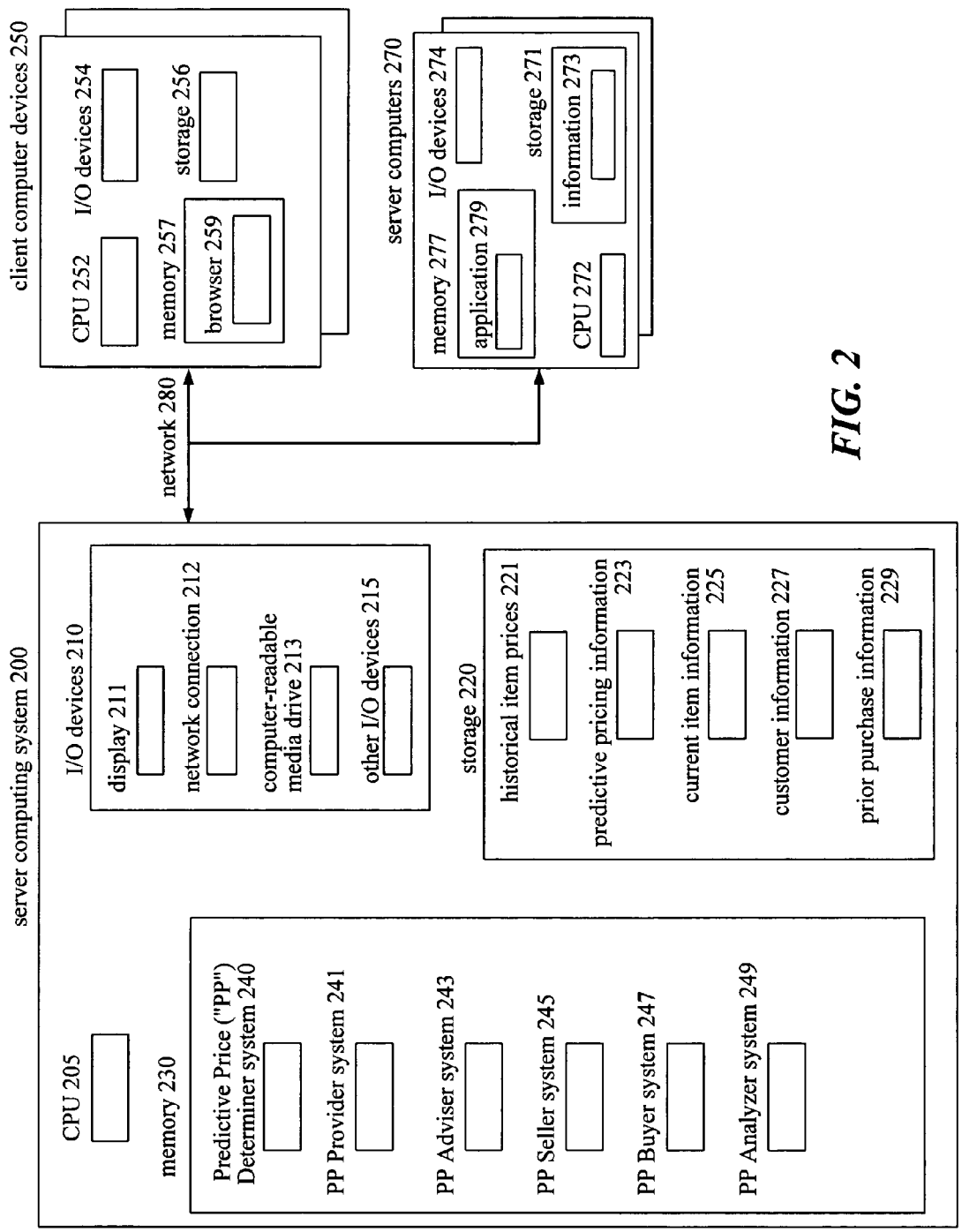
FIG. 2 is a block diagram illustrating an embodiment of a computing system suitable for providing and using disclosed techniques related to predictive pricing.

FIG. 2 illustrates a server computing system 200 suitable for executing embodiments of one or more software systems/modules that perform analyses related to predictive pricing information. The example server computing system includes a CPU 205, various I/O devices 210, storage 220, and memory 230. The I/O devices include a display 211, a network connection 212, a computer-readable media drive 213, and other I/O devices 215.

A Predictive Pricing ("PP") Determiner system facility 240 is executing in memory 230 in this example in order to analyze historical price data and determine predictive pricing information. Similarly, a PP Provider system facility 241 is executing in memory 230 in order to provide predictive pricing information relative to current items on request, such as to users (e.g., buyers and/or sellers) and/or to other system facilities that use that information to provide various services to users.

As the PP Determiner system executes in memory 230, it analyzes various historical item price information, such as that available in a database 221 of storage 220 or instead as obtained from another executing system or remote storage location. After analyzing the historical price information, such as at the request of a user or instead on a scheduled basis, the PP Determiner system determines various predictive pricing information related to the historical item prices (e.g., underlying factors that affect price changes, various patterns or other information about price changes relative to the factors, policies related to responding to current factors, etc.). The system then in the illustrated embodiment stores the determined information in a database 223 on storage, although in other embodiments the system could provide the information interactively to a user or other executing system. In some embodiments and/or situations, the PP Determiner system could also obtain historical price information for use in its analysis by repeatedly querying an external supplier of such information to obtain then-current information, and could then analyze the obtained information, whether dynamically as it is obtained or instead later after a sufficient amount of historical price information has been gathered or on a periodic basis. Such external information sources could be accessed in a variety of ways, such as via one or more server computers 270 over a network 280 (e.g., to retrieve stored information 273 directly and/or via interaction with an application 279 executing in memory).

When predictive pricing information is available, whether via previously stored information in database 223 or in response to a query to the PP Determiner system, the PP Provider system facility 241 executing in memory 230 can obtain and provide predictive pricing information (e.g., for a specified item or group of items), such as in response to a request from a user or other executing system facility. In this illustrated embodiment, example system facilities 243–249 are executing in memory 230 to provide functionality based on predictive pricing information, and thus may provide such requests to the PP Provider system, although in other embodiments some or all of those additional system facilities may instead be executing remotely or may not be present. In this illustrated embodiment, the PP Provider system provides predictive pricing information for a request by obtaining information about predicted future prices for the item as discussed above, by analyzing and modifying the obtained information if needed, and providing information about those predicted future prices. In some embodiments, the system 241 could further obtain, use and provide current pricing information for the items, such as from a current item information database 225 on storage 220, while in other embodiments the PP Provider system may instead obtain and provide predictive pricing information based merely on various current factors for an item, such as those supplied in the request or instead otherwise obtained by the PP Provider system (e.g., from the database 225).

In particular, as one example of a system facility that can obtain and use predictive pricing information, the PP Advisor system facility 243 is executing in memory 230. In response to an indication to provide advice, such as based on an interactive request from a customer or instead based on a scheduled indication to determine whether to provide an alert to a customer based on a previously received request, the PP Advisor system obtains predictive pricing information for one or more items, such as by interacting with the PP Provider system. The PP Advisor system also obtains current price information for those items, and then determines one or more types of advice to provide to an appropriate customer based on that information. In some embodiments, the advice is provided via notifications interactively displayed to the customer that indicate information about current item prices to advise the customer. In other embodiments, the advice may be provided in other forms, such as via an alert sent to a registered customer. Various information about customers may be stored and used when providing advice, such as in a customer database 227 on storage 220, in other to determine when, whether, and how to provide notification to a customer in accordance with their preferences and interests.

As another example of a system facility that uses predictive pricing information, the illustrated embodiment further includes a PP Seller system facility 245 executing in memory 230. The PP Seller system obtains predictive pricing information for one or more items, such as from the PP Provider system, as well as current price information for the items. The PP Seller system then assists a seller (e.g., an intermediate seller) in using the predictive pricing information in one or more of a variety of ways, such as to determine whether and when to offer prices to customers that are lower than prices currently offered by suppliers of items, to accept bids or offers from customers that are lower than prices currently offered by item suppliers but higher than predicted lower future prices for the items, to delay an actual purchase of one or more items from item suppliers that have been purchased from the seller by customers, etc.

The PP Buyer system facility 247 is another example of a system facility executing in memory 230 in the illustrated embodiment that can obtain and use predictive pricing information in order to enable better buying decisions, in this situation by directly assisting buyers (e.g., bulk buyers). In particular, the PP Buyer system obtains predictive pricing information for one or more items, such as from the PP Provider system, as well as current price information for those items. The PP Buyer system facility then assists the buyer in determining whether and when to make purchasing decisions, such as to delay purchases based on predicted future price drops and/or to aggregate multiple purchases together to provide additional benefits, to hedge against such delays by purchasing some items immediately and delaying others, to negotiate with an intermediate seller or item supplier for lower prices based on predicted future price drops, to immediately purchase items that are not otherwise immediately needed based on predicted future price increases, etc.

The PP Analyzer system facility 249 is another example system executing in memory 230 that uses predictive pricing information to provide benefits to customers or other users. The PP Analyzer system analyzes prior purchase information, such as that stored in database 229 on storage 220 or instead as interactively supplied by a user making a request, in order to determine whether the prior purchasing decisions were made effectively. In particular, the PP Analyzer system obtains information about pricing information that would have been predicted for those items at the time of purchase, such as from the PP Provider system, and then compares the actual purchase decisions made to the decisions that would have been advised based on use of the predictive pricing information. In some embodiments, the PP Analyzer system further may obtain historical price information for the purchase items (e.g., from the database 221) that corresponds to offered prices after the purchase date but before a date that the item is needed, such as to determine whether the actual purchase prices were higher than an optimal purchase price that was available. The PP Analyzer system can then provide information about the analysis performed to assist in better future buying decisions.

Those skilled in the art will appreciate that computing systems and devices 200, 250 and 270 are merely illustrative and are not intended to limit the scope of the present invention. Computing system 200 may be connected to other devices that are not illustrated, including through one or more networks such as the Internet (e.g., via the World Wide Web ("Web")) or other computer network. More generally, a "client" or "server" may comprise any combination of hardware or software that can interact in the indicated manner, including computers, network devices, internet appliances, PDAs, wireless phones, pagers, electronic organizers, television-based systems and various other consumer products that include inter-communication capabilities. In addition, the functionality provided by the various system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 3:
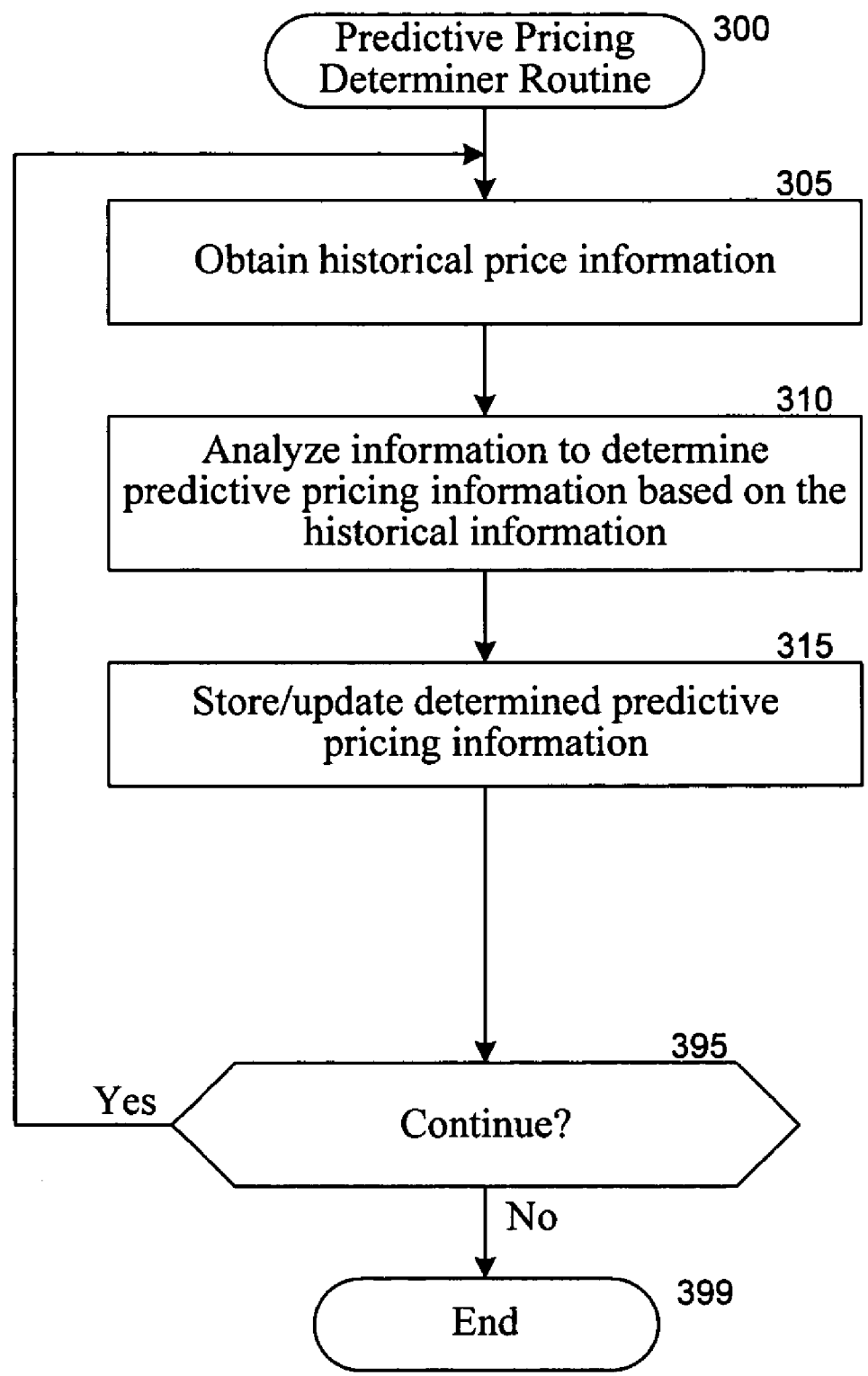
FIG. 3 is a flow diagram of an embodiment of a Predictive Pricing Determiner routine.

FIG. 3 is a flow diagram of an embodiment of a Predictive Pricing Determiner routine 300. The routine begins at step 305, where historical pricing information is obtained for one or more items, and continues to step 310 to analyze the data to determine predictive pricing information based on the historical data. In step 315, the routine then stores or updates previously stored predictive pricing information from the analysis in step 310. After step 315, the routine continues to step 395 to determine whether to continue. If so, the routine returns to step 305, and if not the routine continues to step 399 and ends.

Figure 4:
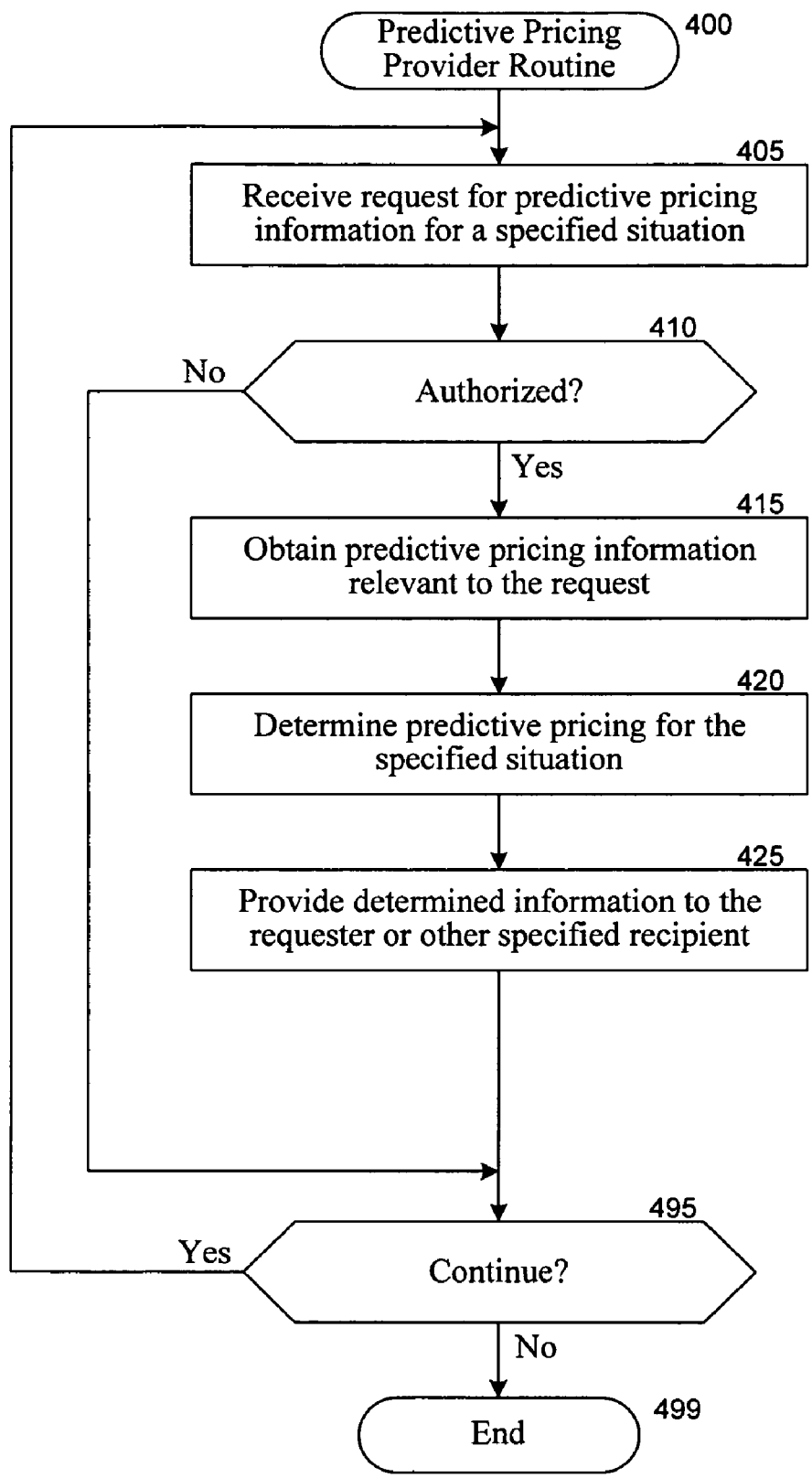
FIG. 4 is a flow diagram of an embodiment of a Predictive Pricing Provider routine.

FIG. 4 is a flow diagram of an embodiment of a Predictive Pricing Provider routine 400. While illustrated here as a routine that is separate from the Predictive Pricing Determiner routine, as well as from other later-discussed routines that use the provided determined information, the routine could instead in other embodiments be incorporated together with one or more such other routines.

The routine begins in step 405, where a request is received for predictive pricing information for one or more specified items and/or a specified situation. The routine continues to step 410 to determine whether the requester is authorized to receive the requested information, such as for a registered customer (whether directly or via another system facility acting as an intermediary on behalf of that customer). If so, the routine continues to step 415 to obtain corresponding predictive pricing information, such as by retrieving stored information or instead by interactively requesting the PP Determiner to provide the information. After step 415, the routine continues to step 420 to determine predictive pricing specific to the request based on the retrieved information, such as one or more specific predicted future prices, a predicted future price pattern, a predicted future direction, predictions about specific times in the future corresponding to predictive prices, etc. While not illustrated here, in some embodiments the routine may further obtain information about current prices for the items, such as to assist in the predictive pricing (e.g., to determine a future price relative to the current price) and/or to enable comparison between the current and predicted future prices. After step 420, the routine continues to step 425 to provide the determined information to the requester. After step 425, or if it was instead determined in step 410 that the requestor was not authorized, the routine continues to step 495 to determine whether to continue. If so, the routine returns to step 405, and if not the routine continues instead to step 499 and ends.

Figure 5:
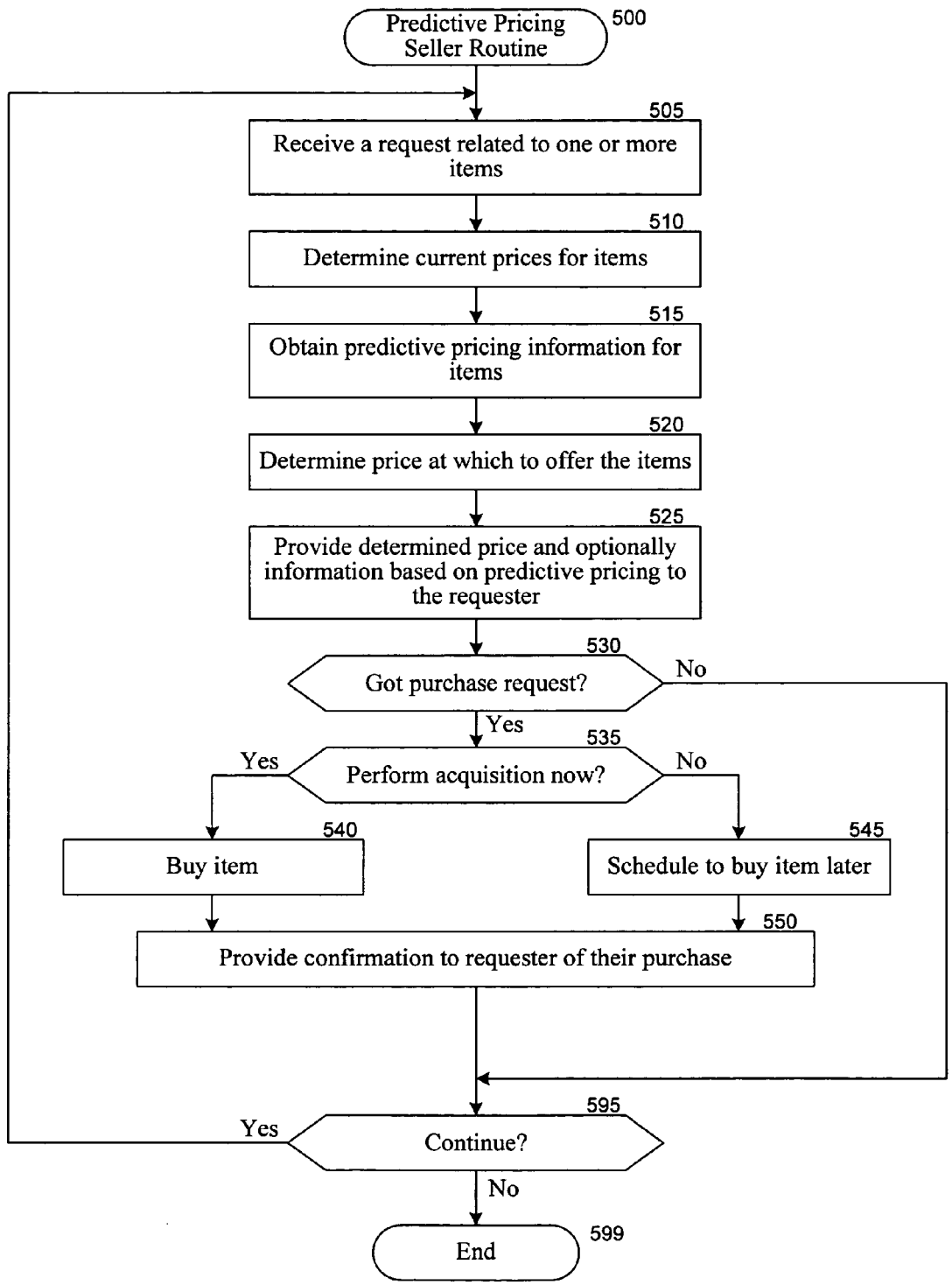
FIG. 5 is a flow diagram of an embodiment of a Predictive Pricing Seller routine.

FIG. 5 is a flow diagram of an embodiment of a Predictive Pricing Seller routine 500. The routine obtains predictive pricing information for one or more items, and uses the information to assist a seller (e.g., an intermediate seller) to perform selling decisions in one or more of a variety of ways.

The routine begins in step 505, where a request is received related to one or more items. In step 510, the routine determines current prices for the items, and in step 515 obtains predicted prices for the items, such as by interacting with the PP Provider routine. In step 520, the routine then determines a price at which to currently offer the items based on the current prices and/or the predicted future prices, and in step 525 provides information about the determined offer and price to the requestor. In other embodiments, a variety of other additional types of functionality could be provided, such as to determine whether to offer price protection insurance to a requestor based on the current prices and/or the predicted future prices. In addition, the determination of the price at which to offer an item can be made in various ways, such as to select prices lower than current offer prices based on predicted future prices dropping, or instead in some embodiments by negotiating with a supplier of the items to obtain a lower offered price from the supplier based on predicted lower future prices.

After step 525, the routine continues in step 530 to determine whether the requestor is interested in purchasing or otherwise acquiring one or more of the items at one of the offered prices. If so, the routine continues to step 535 to determine whether to fulfill the requester's acquisition by actually acquiring the item from an item supplier now or instead by waiting until later (e.g., based on a predicted lower future price). If it is determined that it is preferable to buy now, the routine continues to step 540 to buy the item, and otherwise the routine continues to step 545 to store information about the item and to optionally schedule a later time to buy the item (e.g., to reflect a time at which it is predicted that the price will be lower, or instead to periodically check for lower prices). In some embodiments, the decision to delay a purchase may further be made at least in part on the basis of a goal to aggregate multiple item purchase requests (e.g., for the same item, for related items such as items from a single supplier, etc.) in order to perform hedge activities or otherwise negotiate discounts. After steps 540 or 545, the routine continues to step 550 to provide confirmation to the requester of the requestor's purchase. In situations in which the item has already been bought or is otherwise available, the item may in addition be supplied to the purchaser at this time, while in other situations (e.g., when the actual purchase is delayed), the supplying of the item may similarly be delayed. After step 550, or if it was instead determined in step 530 not to make a purchase, the routine continues in step 595 to determine whether to continue. If so, the routine returns to step 505, and if not the routine continues to step 599 and ends.

Figure 6:
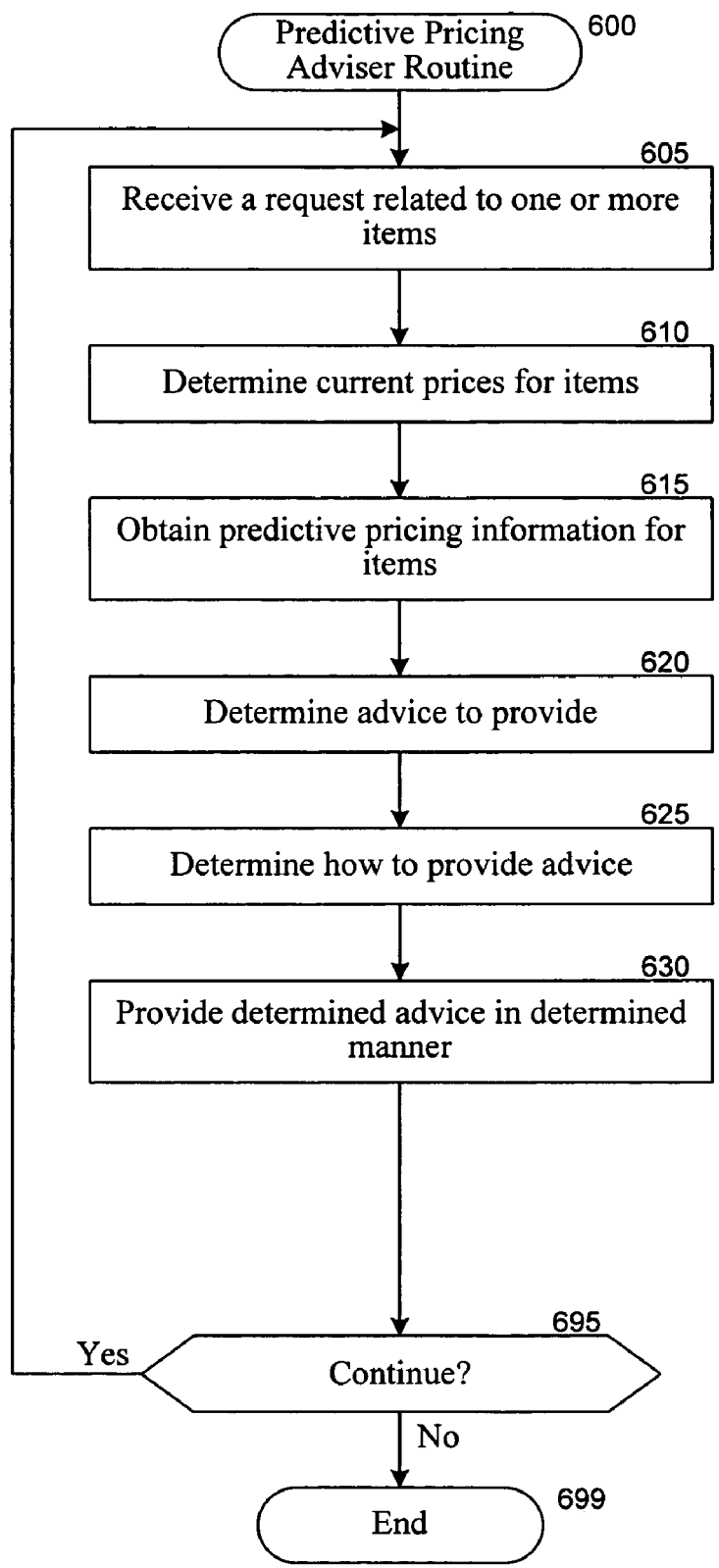
FIG. 6 is a flow diagram of an embodiment of a Predictive Pricing Advisor routine.

FIG. 6 is a flow diagram of a Predictive Pricing Advisor routine 600. The routine obtains predictive pricing information for items and uses the information to provide advice, such as to customers.

The routine begins in step 605, where a request is received related to one or more items. In the illustrated embodiment, the routine is illustrated as providing advice in an interactive manner, although in other embodiments such requests could be for future alerts and could be stored for periodic or scheduled processing to satisfy the requests. After step 605, the routine continues in step 610 to determine current prices for the items corresponding to the request, and in step 615 to obtain predicted prices for the items, such as by interacting with the PP Provider routine. In step 620, the routine determines what advice to give, such as based on a comparison of the current price to the predicted future price and on any other available information. The routine then continues to step 625 to determine how to provide the advice, such as via a notification displayed to the user along with other information or instead by alerting the user proactively in one or more of a variety of ways. After step 625, the routine continues to step 630 to provide the determined advice to the customer in the determined manner. In step 695, the routine then determines whether to continue. If so, the routine returns to step 605, and if not the routine continues to step 699 and ends.

Figure 7:
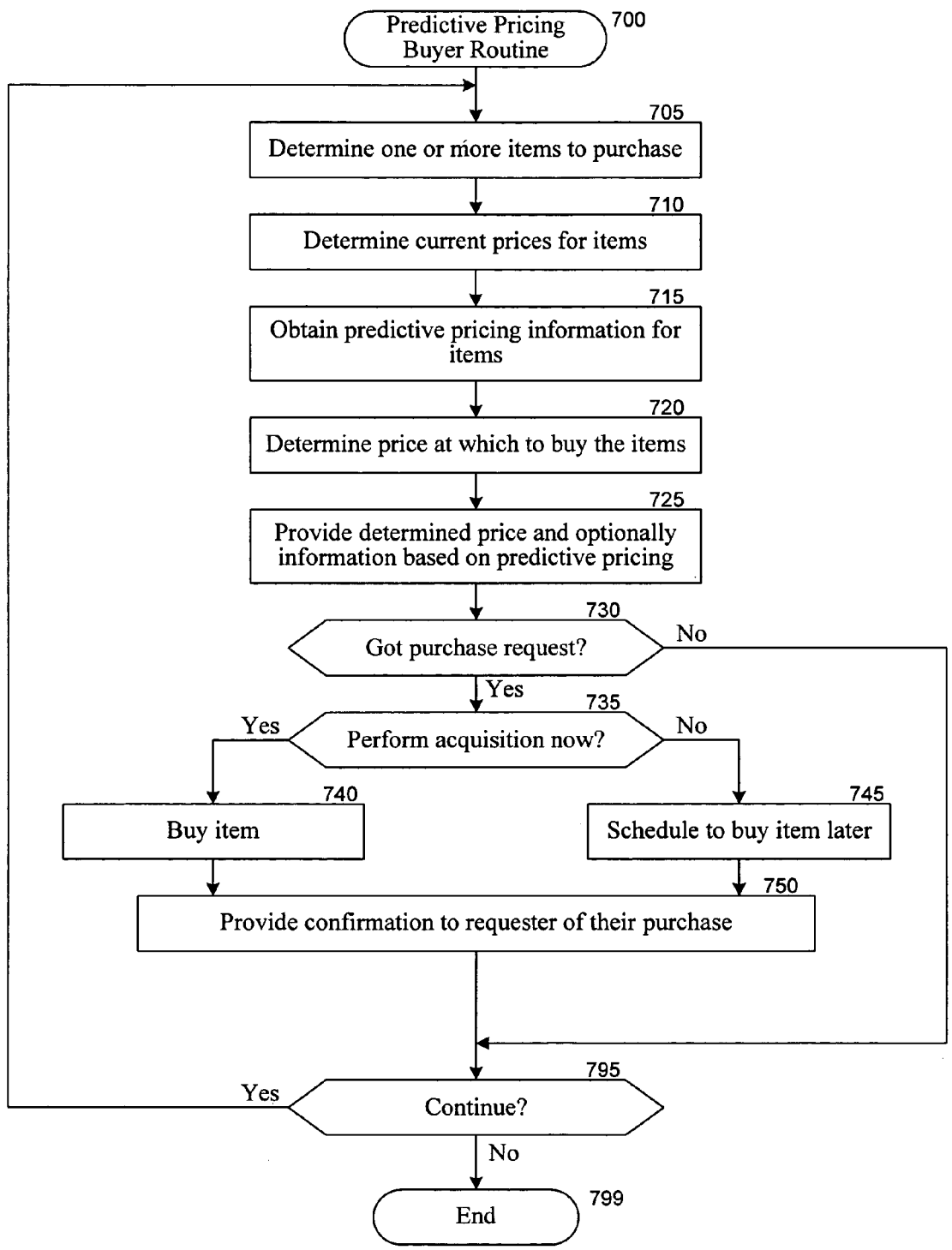
FIG. 7 is a flow diagram of an embodiment of a Predictive Pricing Buyer routine.

FIG. 7 is a flow diagram of an embodiment of a Predictive Pricing Buyer routine 700. The routine obtains and uses predictive pricing information for items in order to assist buyers in making buying decisions, such as for bulk buyers.

The routine begins in step 705, where one or more items of interest to purchase are determined, such as based on a request received from a user. In step 710, the routine determines current prices for the items, and in step 715 obtains predicted prices for the items, such as by interacting with the PP Provider routine. In step 720, the routine determines a price at which to buy some or all of the items and a time at which such purchases should be made. In some embodiments, such a determination could be made by interactively negotiating with an item supplier or intermediate seller in order to obtain discounted prices based on predicted lower future prices, while in other embodiments the determined may be made based on other factors. Similarly, some or all of such items could be determined to have their purchases held until later in order to aggregate for various purposes, such as for a consolidator. In step 725, the routine then provides information about the determined price and optionally additional information about the predictive pricing in an appropriate manner, such as by providing the information to a requester from step 705.

After step 725, the routine continues in step 730 to determine whether an appropriate user is interested in purchasing or otherwise acquiring one or more of the items at one of the offered prices, such as based on a received request. If so, the routine continues to step 735 to determine whether to fulfill that acquisition by actually acquiring the item from an item supplier now or instead by waiting until later (e.g., based on a predicted lower future price). If it is determined that it is preferable to buy now, the routine continues to step 740 to buy the item, and otherwise the routine continues to step 745 to store information about the item and to optionally schedule a later time to buy the item (e.g., to reflect a time at which it is predicted that the price will be lower, or instead to periodically check for lower prices). In some embodiments, the decision to delay a purchase may further be made at least in part on the basis of a goal to aggregate multiple item purchase requests in order to perform hedge activities or otherwise negotiate discounts. After steps 740 or 745, the routine continues to step 750 to provide confirmation of the requested acquisition. After step 750, or if it was instead determined in step 730 not to make a purchase, the routine continues in step 795 to determine whether to continue. If so, the routine returns to step 705, and if not the routine continues to step 799 and ends.

Figure 8:
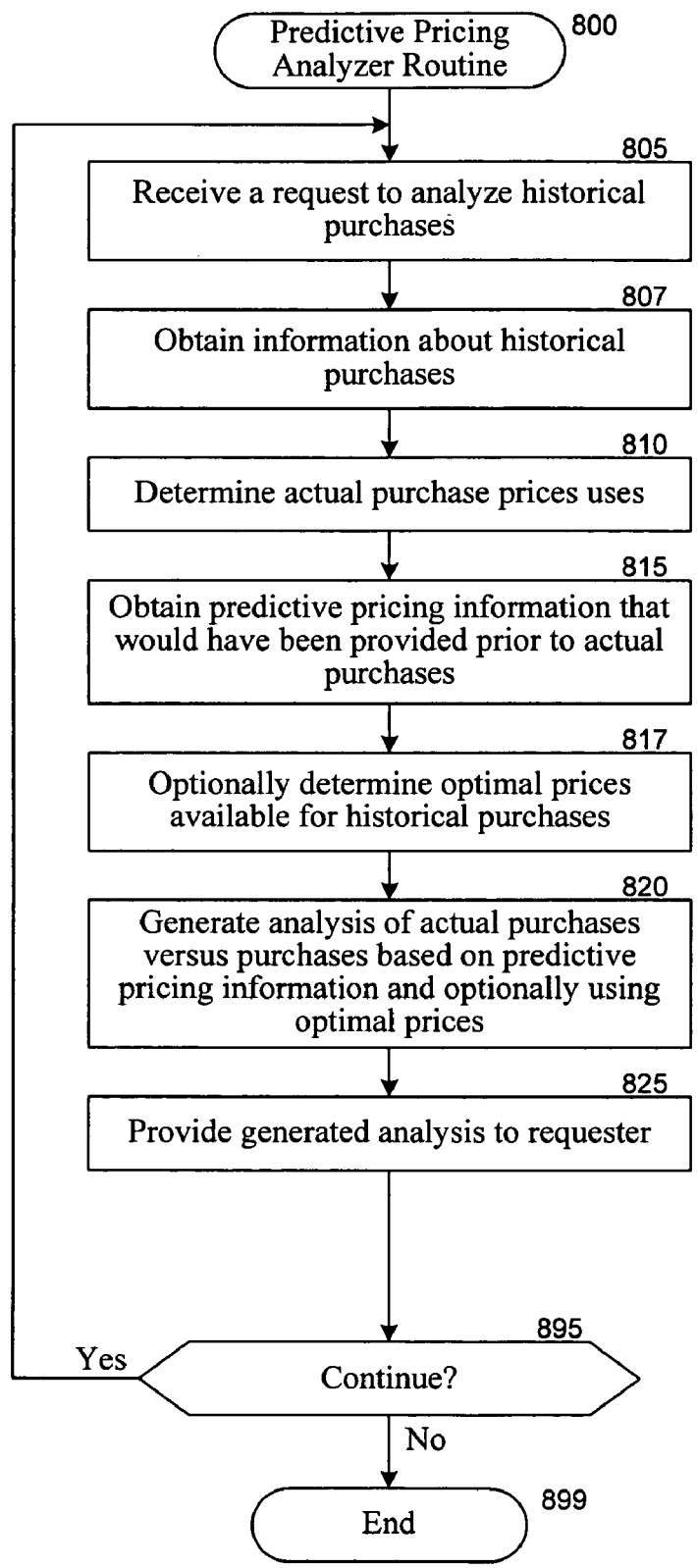
FIG. 8 is a flow diagram of an embodiment of a Predictive Pricing Analyzer routine.

FIG. 8 is a flow diagram of an embodiment of a Predictive Pricing Analyzer routine 800. The routine obtains predictive pricing information for items that corresponds to prior purchases of those items, and uses the predictive pricing information to analyze whether the buying decisions could have been performed more efficiently based on the predictive pricing. In addition, in the illustrated embodiment the routine further compares the previously purchased item prices to later actually available prices in order to determine how the actual and/or predicted prices compare to optimally available prices, although in other embodiments such use of actual later price information may not be used.

In step 805, a request is received to analyze historical purchases of items, and in step 807 the routine obtains information about the historical purchases, although in other embodiments such information may instead be supplied as part of the request in step 805. In step 810, the routine determines the purchase prices for the items, and in step 815 determines the predicted prices that would have been made for those items at that time (e.g., based on data that was then available and/or a version of predictive pricing techniques that were then used), such as based on interactions with the PP Provider routine. In step 820, the routine then generates an analysis of the actual prior purchase prices versus the prices that would have been obtained based on following the predictive pricing advice that would have been provided at that time, and in the illustrated embodiment further generates an analysis based on a comparison to the optimal price that could have been obtained based on other actual offered prices (e.g., before and/or after the time of actual purchase). In step 825, the routine then continues to provide the generated analysis to the requester. After step 825, the routine continues to step 895 to determine whether to continue. If so, the routine returns to step 805, and if not the routine continues to step 899 and ends.

In a similar manner, this or a related routine could use predictive pricing information to assist a user in analyzing historical and/or recent/current pricing information for a specified group of one or more item suppliers, such as on behalf of an item supplier to analyze pricing information for one or more competitors and/or affiliated business entities (e.g., customers, suppliers, partners, etc.). When performed with respect to recent/current pricing information for one or more competitors, for example, such predictive pricing information may allow a user to anticipate likely price changes for those competitors and use that information to guide their own actions, whether in advance of any such actions by the competitors or instead as a response (e.g., an immediate response) if such actions by the competitors occur. If performed in advance, the user may be able to gain a first-mover advantage by use of the predictive pricing information.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

Appendix A provides additional details related to one example of techniques for performing predictive pricing, which in that illustrative example are in the context of airline ticket prices. In addition, those skilled in the art will appreciate that a variety of similar techniques could instead be used in alternative embodiments. Some such additional techniques are discussed generally in "Machine Learning" by Tom M. Mitchell, McGraw-Hill Companies Inc., 1997, which is hereby incorporated by reference in its entirety.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A method for a computing system of an organization to provide information about airline tickets to customers by using predictive pricing that is based on historical airline ticket prices, the method comprising:

in the computing system, retrieving information about prices for airlines tickets that were previously offered to customers for multiple airline flights, each of the previously offered airline ticket prices specified by an airline ticket provider unrelated to the organization;

in the computing system, for each of the multiple airline flights, automatically determining pricing factors for the airline flight that are used to determine prices for the airline flight by the unrelated airline ticket provider for the airline flight, by identifying from the retrieved airline ticket price information multiple previously offered prices for airline tickets for the airline flight; and analyzing the identified previously offered airline ticket prices to detect the pricing factors for the airline flight, the pricing factors corresponding to changes in the identified previously offered airline ticket prices; and in the computing system, after the automatic determining of the pricing factors for the airline flights, and for each of multiple requests that are each from a customer for information about airline flights, automatically advising the customer, by identifying one or more of the multiple airline flights that each satisfy criteria in the request from the customer;

retrieving information about current prices offered for the identified airline flights that are specified by the unrelated airline ticket providers for the airline flights;

predicting future prices that will be offered for the identified airline flights by the unrelated airline ticket providers for those flights, the predicting based at least in part on the determined pricing factors for those airline flights;

for each of the identified airline flights, predicting a time at which an airline ticket for the identified airline flight will be available for a lowest price, based at least in part on the predicted future offered prices and the current offered prices; and using the predicted times to advise the customer related to a current purchase of one or more airline tickets.

2. The method of claim 1 including automatically determining one or more sell-out factors for each of the multiple airline flights based on information about prior instances of the airline flights selling out, and wherein the prediction of each time is further based on a predicted sell-out time for the airline flight, the predicted sell-out time being based at least in part on the determined sell-out factors for that airline flight.

3. The method of claim 1 wherein a predicted future offered price for one of the identified airline flights is lower than the current offered price for the one airline flight, wherein the time predicted for the one identified airline flight is at a later time corresponding to the predicted future offered price, and wherein the using of the predicted times to advise a customer related to a current purchase of an airline ticket includes currently selling an airline ticket for the one identified airline flight to the customer at a price that is lower than the current offered price for that airline flight but at least as high as the predicted future offered price for that airline flight, and wherein the using of the predicted times to advise the customer related to the current purchase of the airline ticket further includes delaying a purchase of that sold airline ticket from the unrelated airline ticket provider for that flight until the later time.

4. The method of claim 1 wherein a predicted future offered price for one of the identified airline flights is higher than the current offered price for the one airline flight, wherein the time predicted for the one identified airline flight is a current time, and wherein the using of the predicted optimal airline ticket purchase times to advise a customer related to a current purchase of an airline ticket includes notifying the customer that the current offered price for the one airline flight is a price favorable to the customer, such that the customer should purchase an airline ticket for the one identified airline flight at the current time.

5. The method of claim 1 wherein one of the requests from a customer is to be alerted if prices for an indicated airline flight are predicted to increase, wherein at a later time a predicted future offered price for the indicated airline flight is determined to be higher than a price that is currently offered at the later time for the indicated airline flight, and wherein the using of the predicted optimal airline ticket purchase times to advise the customer related to a current purchase of an airline ticket includes alerting the customer at the later time to purchase an airline ticket for the indicated airline flight at that time.

6. The method of claim 1 wherein a predicted future offered price for one of the identified airline flights is lower than the price currently offered for the one airline flight at a current time, wherein the time predicted for the one identified airline flight is at a later time corresponding to the predicted future offered price, and wherein the using of the predicted optimal airline ticket purchase times to advise a customer related to a current purchase of an airline ticket includes notifying the customer at the current time to purchase the airline ticket at the later time.

7. The method of claim 1 wherein a predicted future offered price for one of the identified airline flights is higher than the current offered price for the one airline flight, and wherein the using of the predicted optimal airline ticket purchase times to advise a customer related to a current purchase of an airline ticket includes currently offering to sell an airline ticket for the one identified airline flight to the customer at a current sales price and offering to provide at least a partial refund if an actual future offered price for that airline flight is lower than the current sales price.

8. The method of claim 1 wherein one of the requests from a customer is to pay a specified price for an indicated airline flight at an indicated time, the specified price being lower than a current offered price for the indicated airline flight at the indicated time, wherein a predicted future offered price for the indicated airline flight at the indicated time is at least as low as the specified price, and wherein the using of the predicted optimal airline ticket purchase times to advise a customer related to a current purchase of an airline ticket includes currently selling an airline ticket for the indicated airline flight at the indicated time to the customer at the specified price but delaying a purchase of that sold airline ticket from the unrelated airline ticket provider for that flight until a later time.

9. The method of claim 1 wherein the multiple customer requests correspond to prior requests for which the customers have already purchased airline tickets at prior times, and wherein the use of the predicted times to advise a customer is performed at a current time but in a manner as if the predicting of the future prices and the predicting of the optimal time were performed at those prior times, so as to determine at the current time if the customers could likely have completed the purchases of the airline tickets near the prior times but at lower prices.

10. The method of claim 1 wherein multiple of the customer requests include requests to purchase airline tickets for an indicated airline flight at an indicated time, and including fulfilling those requests in an aggregate manner so as to hedge against price changes, the fulfilling including currently purchasing a subset of the requested airline tickets from the unrelated airline ticket provider for that flight and delaying purchasing of the other requested airline tickets from the unrelated airline ticket provider for that flight until a later time.

11. The method of claim 1 wherein the organization is an airline that supplies airline tickets for airline flights of the airline, wherein the retrieved information about airline ticket prices that were previously offered to customers is for airline tickets from one or more unrelated airline ticket providers that are each a competitor airline, wherein the predicted future offered prices for one or more of the identified airline flights of a competitor airline are lower than the currently offered prices for those airline flights such that the time predicted for those airline flights is a later time, and wherein the using of the predicted times to advise a customer related to a current purchase of an airline ticket includes immediately towering current prices on one or more of the airline flights of the organization and notifying the customer that the current prices on the airline flights of the organization are lower than the currently offered prices for airline flights of one or more of the competitor airlines.

12. The method of claim 1 wherein the using of the predicted optimal airline ticket purchase times to advise a customer related to a current purchase of one or more airline tickets is performed for a fee from the customer and/or from unrelated airline ticket providers that offer the tickets and/or from an intermediate seller from whom the one or more airline tickets can be acquired.

13. The method of claim 1 including responding to each request from a customer for information about airline flight prices by providing at least one Web page to the customer that includes information about a current offered price for each of one or more of the identified airline flights that satisfy criteria in the request from the customer, and wherein the using of the predicted optimal airline ticket purchase times to advise a customer related to a current purchase of one or more airline tickets includes providing information as part of the Web page for the customer that provides advice regarding purchasing one or more of the identified airline flights at the current offered prices for those flights.

14. The method of claim 1 wherein the method is further performed for other purchasable items distinct from airline tickets.

15. The method of claim 1 wherein the automatically determined pricing factors for each of at least one of the multiple airline flights includes multiple of an amount of time before the airline flight, a time of year of the airline flight, a degree of availability of airline tickets for the airline flight, a day of week for departure and/or arrival of the airline flight, a class code for the airline flight, a fair basis code for the airline flight, whether a current day is an advance purchase day for the airline flight, and behavior of competitors.

16. The method of claim 1 wherein the automatic determining of the pricing factors for the airline flights and/or the automatic predicting of the future prices that will be offered for identified airline flights and/or the automatic predicting of optimal times to purchase airline tickets for the identified airline flights includes using multiple of statistical-based learning, reinforcement-based learning, rule learning, machine learning, and ensemble-based learning.

17. A computer-readable medium having instructions embedded thereon for performing a method in a computing system of an organization to provide information about airline tickets to customers by using predictive pricing that is based on historical airline ticket prices, the method comprising:

in the computing system, retrieving information about prices for airlines tickets that were previously offered to customers for multiple airline flights, each of the previously offered airline ticket prices specified by an airline ticket provider unrelated to the organization;

in the computing system, for each of the multiple airline flights, automatically determining pricing factors for the airline flight that are used to determine prices for the airline flight by the unrelated airline ticket provider for the airline flight, by identifying from the retrieved airline ticket price information multiple previously offered prices for airline tickets for the airline flight; and analyzing the identified previously offered airline ticket prices to detect the pricing factors for the airline flight, the pricing factors corresponding to changes in the identified previously offered airline ticket prices; and in the computing system, after the automatic determining of the pricing factors for the airline flights, and for each of multiple requests that are each from a customer for information about airline flights, automatically advising the customer, by identifying one or more of the multiple airline flights that each satisfy criteria in the request from the customer;

retrieving information about current prices offered for the identified airline flights that are specified by the unrelated airline ticket providers for the airline flights;

predicting future prices that will be offered for the identified airline flights by the unrelated airline ticket providers for those flights, the predicting based at least in part on the determined pricing factors for those airline flights;

for each of the identified airline flights, predicting a time at which an airline ticket for the identified aiding flight will be available for a lowest price, based at least in part on the predicted future offered prices and the current offered prices; and using the predicted times to advise the customer related to a current purchase of one or more airline tickets.

18. The computer-readable medium of claim 17 wherein the method includes automatically determining one or more sell-out factors for each of the multiple airline flights based on information about prior instances of the airline flights selling out, and wherein the prediction of each time is further based on a predicted sell-out time for the airline flight, the predicted sell-out time being based at least in part on the determined sell-out factors for that airline flight.

19. The computer-readable medium of claim 17 wherein a predicted future offered price for one of the identified airline flights is lower than the current offered price for the one airline flight wherein the time predicted for the one identified airline flight is at a later time corresponding to the predicted future offered price, and wherein the using of the predicted times to advise a customer related to a current purchase of an airline ticket includes currently selling an airline ticket for the one identified airline flight to the customer at a price that is lower than the current offered price for that airline flight but at least as high as the predicted future offered price for that airline flight, and wherein the using of the predicted times to advise the customer related to the current purchase of the airline ticket further includes delaying a purchase of that sold airline ticket from the unrelated airline ticket provider for that flight until the later time.

20. The computer-readable medium of claim 17 wherein a predicted future offered price for one of the identified airline flights is higher than the current offered price for the one airline flight, wherein the time predicted for the one identified airline flight is a current time, and wherein the using of the predicted optimal airline ticket purchase times to advise a customer related to a current purchase of en airline ticket includes notifying the customer that the current offered price for the one airline flight is a price favorable to the customer, such that the customer should purchase an airline ticket for the one identified airline flight at the current time.

21. The computer-readable medium of claim 17 wherein one of the requests from a customer is to be alerted if prices for an indicated airline flight are predicted to increase, wherein at a later time a predicted future offered price for the indicated airline flight is determined to be higher than a price that is currently offered at the later time for the indicated airline flight, and wherein the using of the predicted optimal airline ticket purchase times to advise the customer related to a current purchase of an airline ticket includes alerting the customer at the later time to purchase an airline ticket for the indicated airline flight at that time.

22. The computer-readable medium of claim 17 wherein a predicted future offered price for one of the identified airline flights is lower than the price currently offered for the one airline flight at a current time, wherein the time predicted for the one identified airline flight is at a later time corresponding to the predicted future offered price, and wherein the using of the predicted optimal airline ticket purchase times to advise a customer related to a current purchase of an airline ticket includes notifying the customer at the current time to purchase the airline ticket at the later time.

23. The computer-readable medium of claim 17 wherein a predicted future offered price for one of the identified airline flights is higher than the current offered price for the one airline flight, and wherein the using of the predicted optimal airline ticket purchase times to advise a customer related to a current purchase of an airline ticket includes currently offering to sell an airline ticket for the one identified airline flight to the customer at a current sales price and offering to provide at least a partial refund if an actual future offered price for that airline flight is lower than the current sales price.

24. The computer-readable medium of claim 17 wherein one of the requests from a customer is to pay a specified price for an indicated airline flight at an indicated time, the specified price being lower than a current offered price for the indicated airline flight at the indicated time, wherein a predicted future offered price for the indicated airline flight at the indicated time is at least as low as the specified price, and wherein the using of the predicted optimal airline ticket purchase times to advise a customer related to a current purchase of an airline ticket includes currently selling an airline ticket for the indicated airline flight at the indicated time to the customer at the specified price but delaying a purchase of that sold airline ticket from the unrelated airline ticket provider for that flight until a later time.

25. The computer-readable medium of claim 17 wherein the multiple customer requests correspond to prior requests for which the customers have already purchased airline tickets at prior times, and wherein the use of the predicted times to advise a customer is performed at a current time but in a manner as if the predicting of the future prices and the predicting of the optimal time were performed at those prior times, so as to determine at the current time if the customers could likely have completed the purchases of the airline tickets near the prior times but at lower prices.

26. The computer-readable medium of claim 17 wherein multiple of the customer requests include requests to purchase airline tickets for an indicated airline flight at an indicated time, and including fulfilling those requests in an aggregate manner so as to hedge against price changes, the fulfilling including currently purchasing a subset of the requested airline tickets from the unrelated airline ticket provider for that flight and delaying purchasing of the other requested airline tickets from the unrelated airline ticket provider for that flight until a later time.

27. The computer-readable medium of claim 17 wherein the organization is an airline that supplies airline tickets for airline flights of the airline, wherein the retrieved information about airline ticket prices that were previously offered to customers is for airline tickets from one or more unrelated airline ticket providers that are each a competitor airline, wherein the predicted future offered prices for one or more of the identified airline flights of a competitor airline are lower than the currently offered prices for those airline flights such that the time predicted for those airline flights is a later time, and wherein the using of the predicted times to advise a customer related to a current purchase of an airline ticket includes immediately lowering current prices on one or more of the airline flights of the organization and notifying the customer that the current prices on the airline flights of the organization are lower than the currently offered prices for airline flights of one or more of the competitor airlines.

28. The computer-readable medium of claim 17 wherein the using of the predicted optimal airline ticket purchase times to advise a customer related to a current purchase of one or more airline tickets is performed for a fee from the customer and/or from unrelated airline ticket providers that offer the tickets and/or from an intermediate seller from whom the one or more airline tickets can be acquired.

29. The computer-readable medium of claim 17 including responding to each request from a customer for information about airline flight prices by providing at least one Web page to the customer that includes information about a current offered price for each of one or more of the identified airline flights that satisfy criteria in the request from the customer, and wherein the using of the predicted optimal airline ticket purchase times to advise a customer related to a current purchase of one or more airline tickets includes providing information as part of the Web page for the customer that provides advice regarding purchasing one or more of the identified airline flights at the current offered prices for those flights.

30. The computer-readable medium of claim 17 wherein the method is further performed for other purchasable items distinct from airline tickets.

31. The computer-readable medium of claim 17 wherein the automatically determined pricing factors for each of at least one of the multiple airline flights includes multiple of an amount of time before the airline flight, a time of year of the airline flight, a degree of availability of airline tickets for the airline flight, a day of week for departure and/or arrival of the airline flight a class code for the airline flight, a fair basis code for the airline flight, whether a current day is an advance purchase day for the airline flight and behavior of competitors.

32. The computer-readable medium of claim 17 wherein the automatic determining of the pricing factors for the airline flights and/or the automatic predicting of the future prices that will be offered for identified airline flights and/or the automatic predicting of optimal times to purchase airline tickets for the identified airline flights includes using multiple of statistical-based learning, reinforcement-based learning, rule learning, machine learning, and ensemble-based learning.

* * * * *

UNITED STATES PATENT AND TRADEMARK OFFICE
CERTIFICATE OF CORRECTION

PATENT NO. : 7,010,494 B2
APPLICATION NO. : 10/811077
DATED : March 7, 2006
INVENTOR(S) : Oren Etzioni et al.

It is certified that error appears in the above-identified patent and that said Letters Patent is hereby corrected as shown below:

Column 22
Line 8, "towering" should be --lowering--;

Column 23
Line 31, "aiding" should be --airline--;
Line 67, "en" should be --an--.

Signed and Sealed this

Eleventh Day of July, 2006

JON W. DUDAS
*Director of the United States Patent and Trademark Office*